US006820989B2

United States Patent
Lee et al.

(10) Patent No.: US 6,820,989 B2
(45) Date of Patent: Nov. 23, 2004

(54) LIGHT SOURCE DEVICE, BACKLIGHT ASSEMBLY AND LIQUID CRYSTAL DISPLAY DEVICE HAVING THE SAME

(75) Inventors: Ik-Soo Lee, Suwon-si (KR); Keun-Woo Lee, Suwon-si (KR); Meen-Woo Kwak, Yongin-si (KR); Jeong-Hwan Lee, Suwon-si (KR); Sang-Hyuck Youn, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 124 days.

(21) Appl. No.: 10/109,676

(22) Filed: Apr. 1, 2002

(65) Prior Publication Data

US 2002/0141173 A1 Oct. 3, 2002

(30) Foreign Application Priority Data

Apr. 2, 2001 (KR) ........................................ 2001-17434
Jul. 12, 2001 (KR) ........................................ 2001-41943

(51) Int. Cl.$^7$ ............................................. G01D 11/28
(52) U.S. Cl. ........................... 362/26; 362/31; 362/293; 349/65

(58) Field of Search ............................... 362/26, 27, 31, 362/293, 583; 313/635; 349/65, 70

(56) References Cited

U.S. PATENT DOCUMENTS 4,460,940 A * 7/1984 Mori ............................ 362/31

FOREIGN PATENT DOCUMENTS

TW            331980           5/1998

* cited by examiner

*Primary Examiner*—Stephen F. Husar
(74) *Attorney, Agent, or Firm*—McGuireWoods LLP

(57) ABSTRACT

A light source device for preventing a light guide plate from being discolored due to a light supplied by a lamp is disclosed. At least one masking film that is made of a transition metal oxide is disposed in a pathway of the light that is emitted by the lamp and transmitted to a display unit to display images in order to cut off ultraviolet rays having particular wavelengths capable of discoloring the light guide plate. Accordingly, it is possible to prevent the light guide plate, which is made of polyolefin resin composition to make it lightweight, from discoloring in yellow.

34 Claims, 24 Drawing Sheets

LIGHT SOURCE DEVICE, BACKLIGHT ASSEMBLY AND LIQUID CRYSTAL DISPLAY DEVICE HAVING THE SAME

BACKGROUND OF THE INVENTION

1. Field of the Invention

The present invention relates to a liquid crystal display device, and more particularly to a light source device, a backlight assembly and a liquid crystal display device for preventing a light guide plate from being discolored due to light emitted by a lamp.

2. Description of the Related Art

Presently, information processing devices are developed for various shapes and functions and higher processing speed. The information processing devices convert various type of information into electrical signals. Display devices function as an interface between users and the information processing devices such that the users can identify the information processed by the information processing devices.

Recently, the display device manufacturing industry has been focusing on developing smaller and lighter liquid display devices. The liquid display devices provide richer and fuller colors and higher resolutions as compared with conventional display devices, such as a CRT (Cathode Ray Tube). As the result, the liquid display devices have been gaining its popularity among other display devices, for example, computer monitors, household television sets that are hung on a wall, and the like.

Generally, to operate a liquid crystal display device, a voltage is applied to the liquid crystal in the predetermined molecule arrays to change the liquid crystal in the other arrays, which alters the optical characteristics of the liquid crystal, such as a double refractivity, a rotatory polarization, a dichroism and a light scattering according to the molecule arrays of the liquid crystal to emit the light. Therefore, the liquid crystal display device can display the images according to the changes of the optical characteristics of the liquid crystal cell.

FIG. 1 is an exploded perspective view showing a liquid crystal display device according to the conventional art schematically, and FIG. 2 is a sectional view of showing the constructions of a lamp shown in FIG. 1. FIG. 3 is a graph for showing a discoloration of a light guide plate due to light supplied by the lamp shown in FIG. 1.

Referring to FIGS. 1 and 2, the liquid crystal display device comprises a liquid crystal display module for displaying images when image signals are applied thereto and a case (not shown) for accommodating the liquid crystal display module. The liquid crystal display module includes a display unit having a liquid crystal display panel for displaying the images.

The display unit 200 includes the liquid crystal display panel 210, a printed circuit board 220 for transferring data signals, a printed circuit board 212 for transferring gate signals, a tape carrier package 230 for transferring data signals and a tape carrier package 250 for transferring gate signals.

The liquid crystal display panel 210 includes a thin film transistor board 212 which is normally a transparent glass on which the thin flhn transistors are formed in a matrix, a color filter board 214 having RGB pixels that are formed thereon by a thin film process and present predetermined colors while the light passes through the color filter board 214, and liquid crystal (not shown).

When the thin film transistors of the thin film transistor board 212 are turned on, electric field is created between the pixel electrodes of the thin film transistor board 212 and the common electrodes of the color filter board 214. The electric field changes the liquid crystal layer's array angle, and changes the light transmittivity. As a result, it is possible to gain the desired pixels.

A driving signal and a timing signal are applied to the gate lines and data lines of the thin film transistor in order to control the array angle of the liquid crystal and the time of arraying the liquid crystal in the liquid crystal display panel 210. That is, the printed circuit boards 220 and 240 generate and apply the gate driving signal and the data signal for driving the liquid crystal display device and a plurality of timing signals for applying the gate driving signal and the data signal, to the gate lines and the data lines of the liquid crystal display panel 210.

The backlight assembly 300 is provided under the display unit 200 to supply the light to the display unit 200 uniformly. The backlight assembly 300 includes a lamp 310 for generating the light. The lamp 310 is protected by a lamp cover 312.

As shown in FIG. 2, the lamp 310 has a glass tube 301 in which inert gas is filled up and a hot electrode and a cold electrode 303 and 305 to which high voltage electricity and low voltage electricity are respectively applied are disposed at both ends respectively. Metal electrodes 303a and 305a are mounted at the hot and cold electrodes 303 and 305, respectively, in the glass tube. As outer voltages discharge electricity between the two electrodes, the inert gas 309 is excited and ultraviolet rays are generated from the inert gas 309. Some ultraviolet rays 311 are conversed into visible rays 313 by the fluorescent material in the glass tube 301 and then supplied to the light guide plate 320.

The light guide plate 320 has a size corresponding to that of the liquid crystal panel 210 of the display unit 200, which is disposed under the liquid crystal panel 210 to guide the light emitted by the lamp 310 toward the display unit 200 by changing a pathway of the light.

A plurality of optical sheets 330 are provided on the light guide plate 320 to make brightness of the light from the light guide plate 320 to the liquid crystal display panel 210 uniformly. In addition, a light reflecting plate 340 provided under the light guide plate 320 reflect leaking light to the light guide plate 320 so as to improve the efficiency of the light.

The display unit 200 and the backlight assembly 300 are supported by means of a mold frame 400 used as a receptacle. The mold frame 400 is provided with a top chassis 500 for preventing the display unit 200 from departing from the mold frame 400 while the printed circuit boards 220 and 240 are bent toward outside of the mold frame 400 and fixed to the bottom surface of the mold frame 400.

The light guide plate 320 of polymethyl methacrylate (hereinafter, referred to as PMMA) effects the size and the weight of the liquid crystal display unit. As the size of the light guide plate 320 is directly related to a size of the liquid crystal display panel, however, researches have been continued to produce a liquid crystal display device that is light, thin and small by reducing the weight of the light guide plate 320 as much as possible.

Recently, for an example, a light guide plate which uses cycloolefin polymer (hereinafter, referred to as COP) has been developed to reduce the weight thereof. As shown in FIG. 3, however, the COP light guide plate is susceptible to the ultraviolet rays in the light emitted by the lamp 310 as compared with PMMA light guide plate.

For an example, when the PMMA light guide plate was aged at an ordinary temperature for 3300 hours, the PMMA light guide plate had changes ΔX and ΔY in the order of 0.015 on X and Y color coordinates. However, the COP light guide plate had changes ΔX and ΔY in the order of 0.025 and 0.032 on X and Y color coordinates. This is caused by a recombination reaction of the polyolefin resin composition to the ultraviolet rays, and the light guide plate is subjected to discoloration into yellow when used for a long period of time.

Besides, as shown in a graph in FIG. 4, when aged for about 3000 hours, a maintenance rate of brightness for the PMMA light guide plate is about 70%, while a maintenance rate of brightness for the COP light guide plate is about 60%.

Hence, COP light guide plate has the problems of discoloration and degradation of brightness characteristics as aged.

SUMMARY OF THE INVENTION

The present invention is directed to solving the aforementioned problems, and accordingly it is an object of the present invention to provide a light source device for preventing a light guide plate from being discolored due to light supplied from a lamp.

It is another object of the present invention to provide a backlight assembly having the light source device that prevents a light guide plate from being discolored due to light supplied from a lamp.

It is further another object of the present invention to provide a liquid crystal display device having the backlight assembly that prevents light guide plate from being discolored due to light supplied from a lamp.

In order to achieve the above objects of the present invention, a light source device according to the present invention comprises a glass tube, an electrode, and a masking film. The glass tube is filled up with a gas filler, and includes a mixture layer having a fluorescence material therein. The electrode is disposed in the glass tube, and generates arc in response to an electric signal applied thereto. The masking film is coated on the glass tube, and cuts off a part of ultraviolet rays emitted from the glass tube.

According to another aspect of the present invention, a backlight assembly according to the present invention comprises a light generating section which has a glass tube filled up with a gas filler and having a mixture layer having fluorescence material therein, for generating light in response to an electric current applied to an electrode which is disposed in the glass tube. A light masking film is coated on the light generating section to cut off a part of ultraviolet rays in the light. The light transmitted through the light masking film from the light generating section is guided by means of a light guide section to a display unit in order to display images.

According to yet another aspect of the present invention, a liquid crystal display device according to the present invention comprises a lamp unit for generating light in response to an electric current applied to an electrode which is disposed in a glass tube filled up with a glass tube and including a mixture layer having fluorescence material therein, a light guiding unit for guiding the light, a display unit for displaying images in response to the light transmitted from the light guiding means, a film for cutting off a part of ultraviolet rays emitted by the glass tube, a receiving unit for receiving the lamp unit and the light guiding unit, and a top chassis for adjusting a position of the display unit and for fixing the display unit to the receiving unit by being assembled to face the receiving unit.

Preferably, the light masking film is positioned on at least one of an inner surface of the glass tube between the mixture layer and the glass tube, an outer surface of the glass tube, and a light incidence surface of the light guiding unit into which the light emitted by the light generating unit is incident.

Preferably, the light masking film coated on the glass tube has a thickness range of about 0.5 μm to about 1 μm, and comprises one selected from the group consisting of $TiO_2$, $Y_2O_3$ and $Ce_2O_5$. The light masking film cuts off ultraviolet rays having wavelengths of 253 nm, 313 nm and 365 nm.

Preferably, the light guiding unit comprises at least one polyolefin resin composition. The light guiding unit is formed by mixing the polyolefin resin with one selected from the group consisting of $TiO_2$, $Y_2O_3$, $Ce_2O_5$ and $SiO_2$.

Preferably, the light guiding unit is formed by mixing the polyolefin resin with a benzene derivative, especially such that any one of 2-($e^-$-hydroxy-5-methlyphenol)-benzotriazole and p-phenylene-bis (1,3-benzoxizine)-4-5 NE According to the light source device of the present invention, a backlight assembly and a liquid crystal display device, at least one light masking film that is made of transition metal oxide is disposed in a pathway of the light that is emitted by the lamp and transmitted to a display unit to display images in order to cut off ultraviolet rays having particular wavelengths capable of discoloring the light guide plate. Accordingly, it is possible to prevent the light guide plate, which is made of polyolefin resin composition to make it lightweight, from discoloring in yellow.

BRIEF DESCRIPTION OF THE DRAWINGS

The above and other objects and advantages of the present invention will become readily apparent by reference to the following detailed description when considered in conjunction with the accompanying drawings wherein.

DETAILED DESCRIPTION OF THE PREFERRED EMBODIMENTS

Hereinafter, the preferred embodiment of the present invention will be described in detail with reference to the accompanying drawings.

Figure 1:
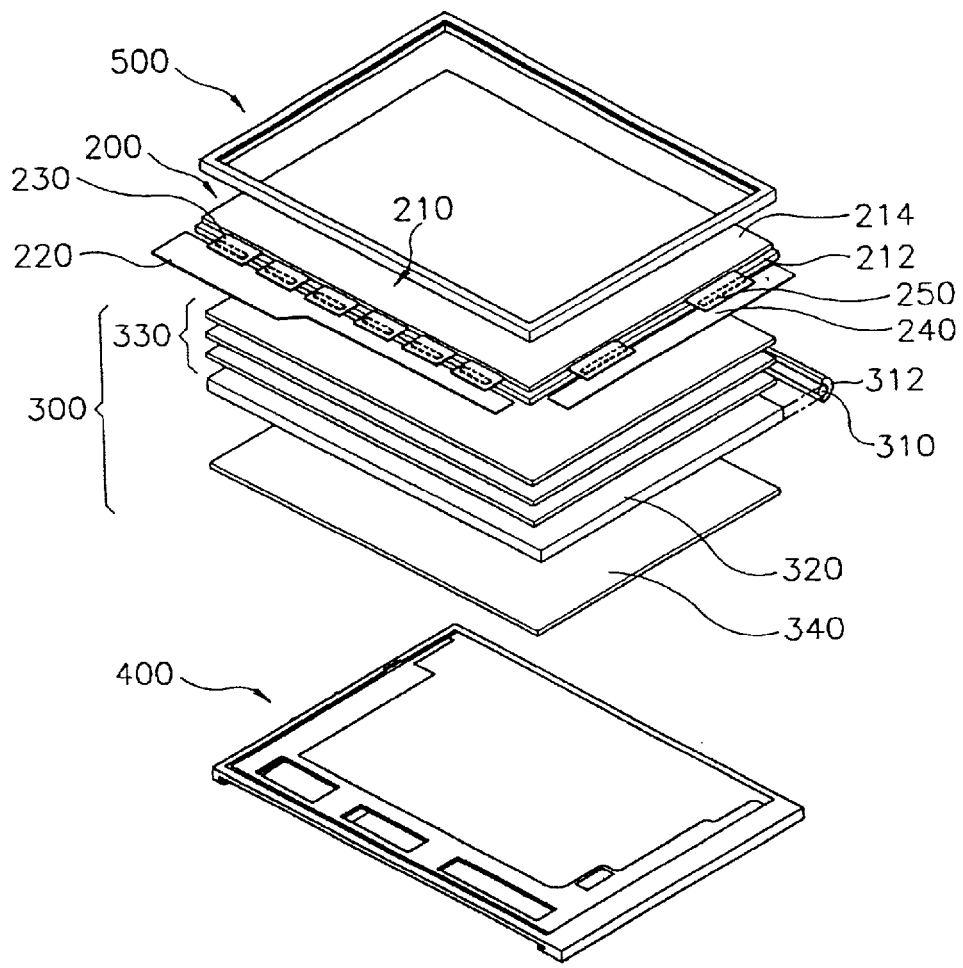
FIG. 1 is an exploded perspective view schematically showing a liquid crystal display device according to the conventional art.
Figure 2:
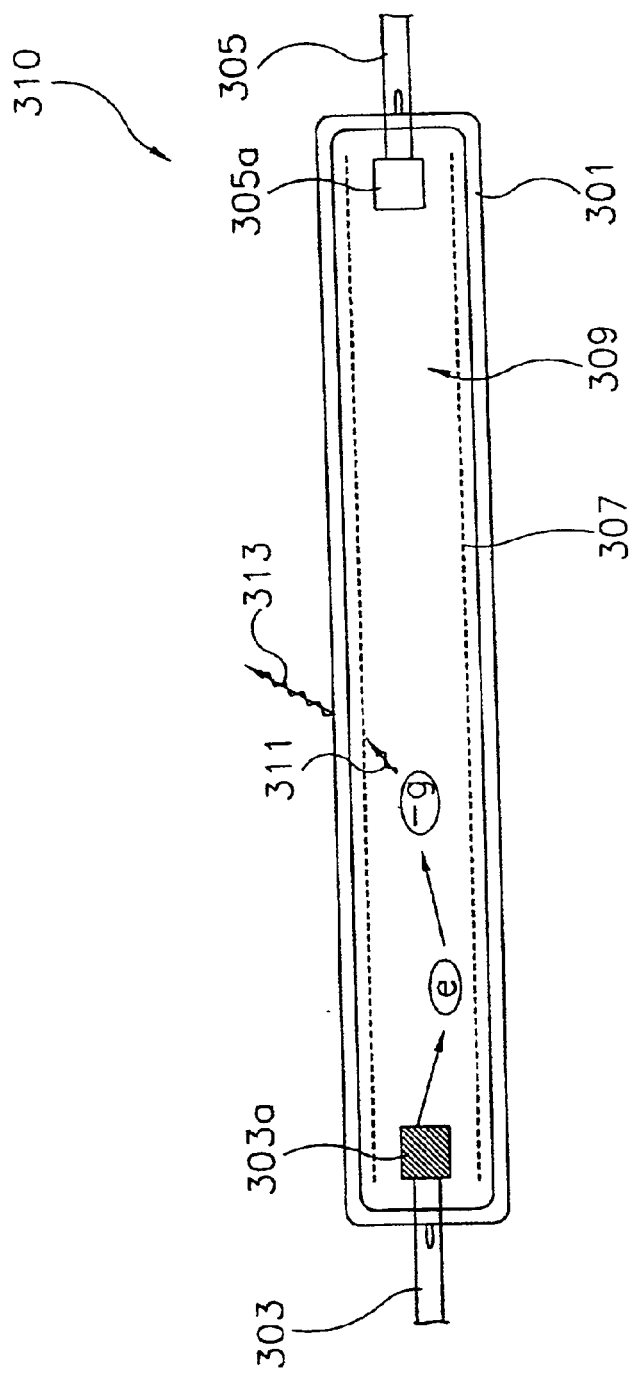
FIG. 2 is a sectional view showing a construction of a lamp shown in FIG. 1.
Figure 3:
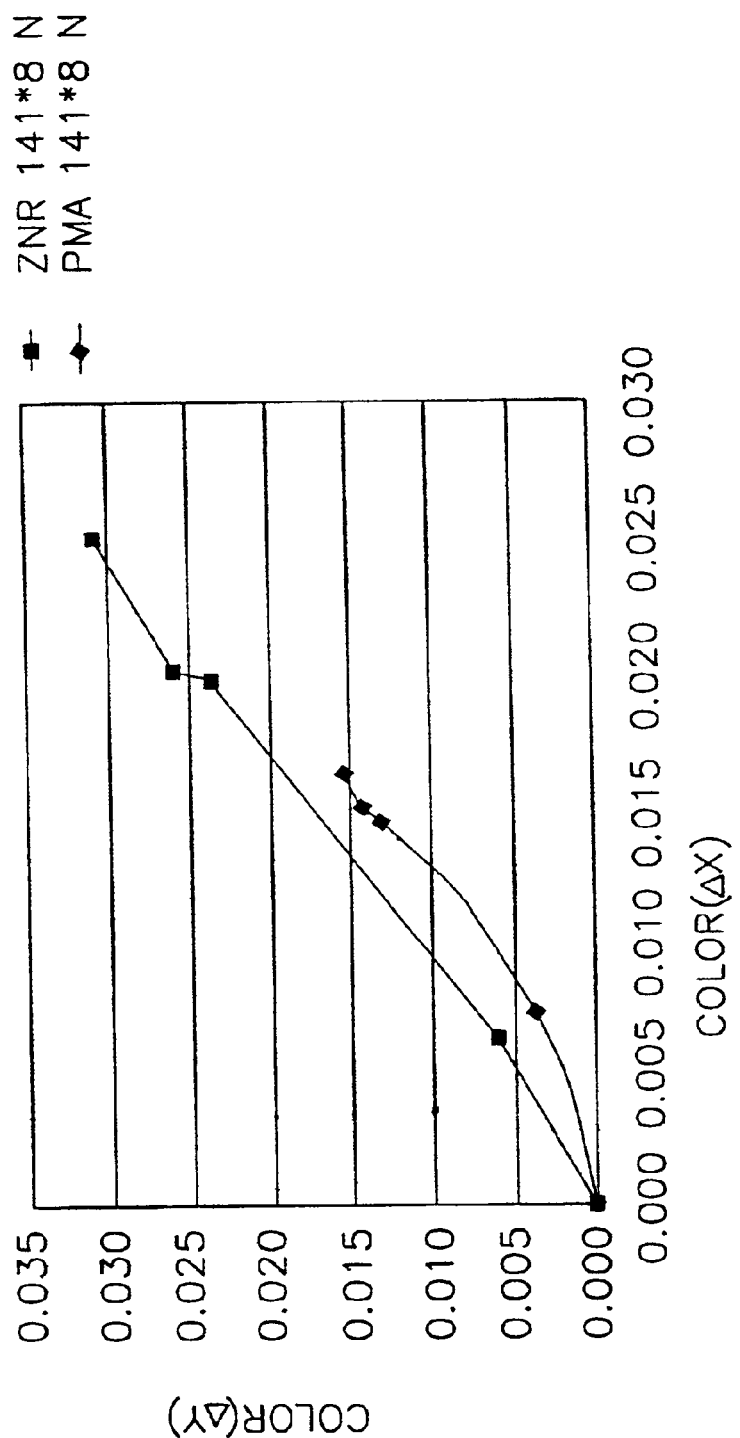
FIG. 3 is a graph showing discoloration of a light guide plate of FIG. 2 due to light emitted from the lamp shown in FIG. 1.
Figure 4:
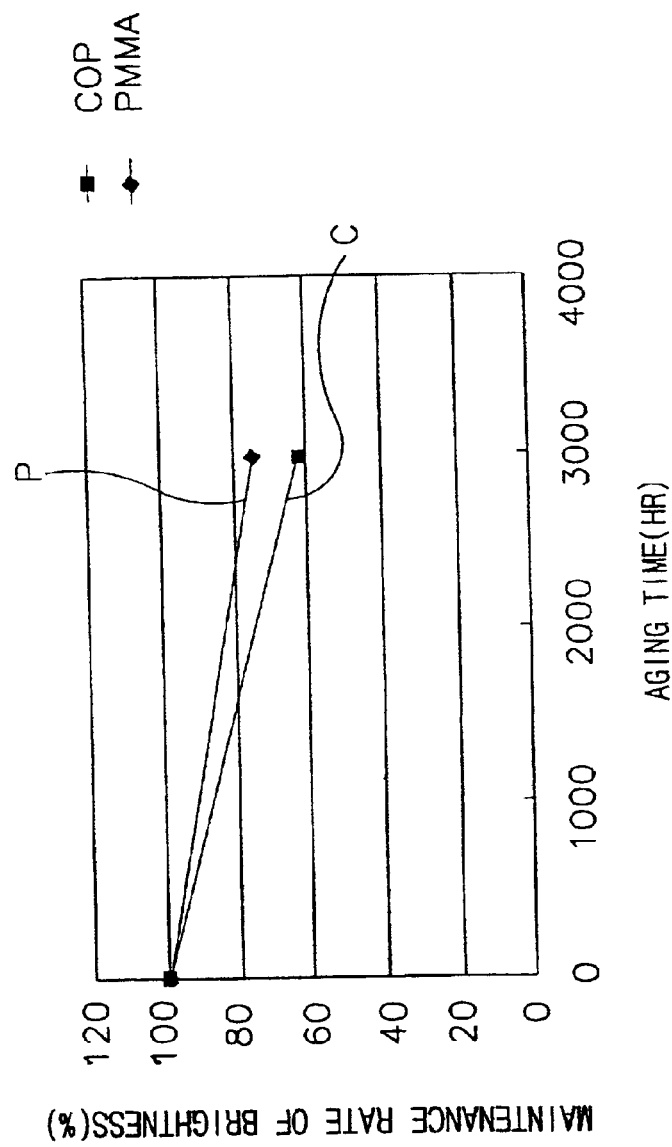
FIG. 4 is a graph showing maintenance rates of brightness of a PMMA light guide plate and a COP light guide plate shown in FIG. 3.
Figure 5:
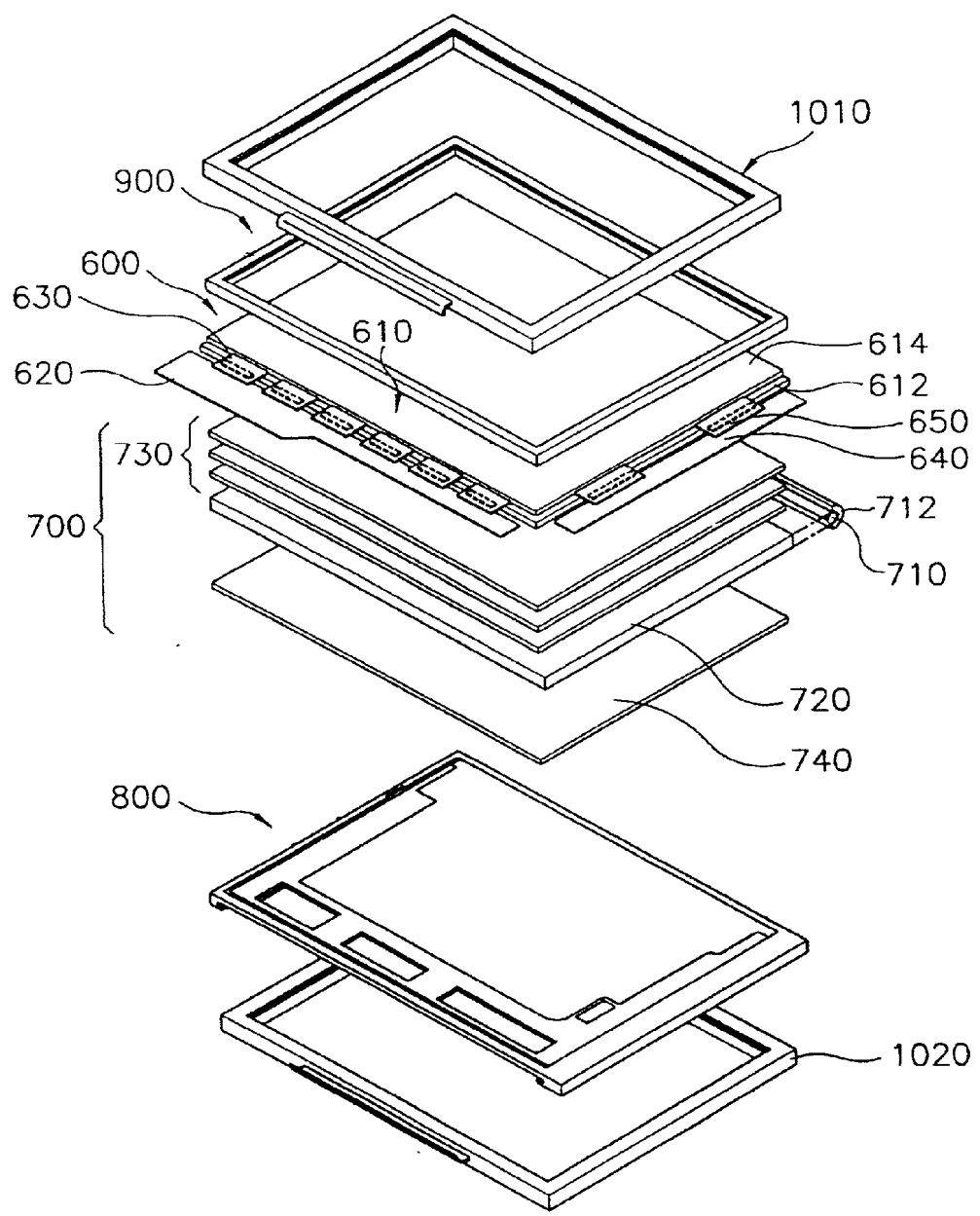
FIG. 5 is an exploded perspective view schematically showing a liquid crystal display device according to a preferred embodiment of the present invention.

FIG. 5 is an exploded perspective view schematically showing a liquid crystal display device according to a preferred embodiment of the present invention. FIGS. 6, 7, 8 and 9 are views showing examples of the constructions of the lamp in a backlight assembly shown in FIG. 5.

Figure 6:
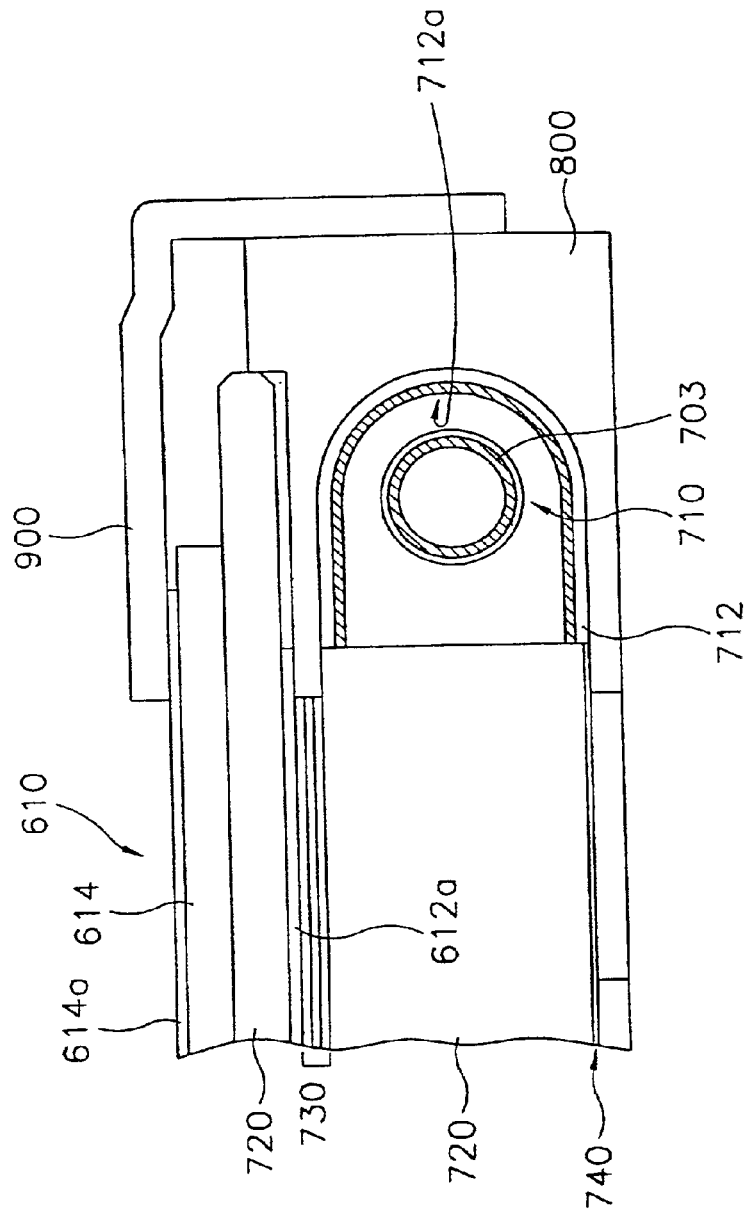
FIGS. 6, 7, 8, 9, 10, 11, 12, 13, 14, 15, 16, 17, 18, 19 and 20 are views of showing examples of the constructions of the lamp in a backlight assembly shown in FIG. 5.

Referring to FIGS. 5 and 6, the liquid crystal display device includes a liquid crystal display module for displaying images when an image signal is applied thereto and a case that has front and rear cases 1010 and 1020, for receiving the liquid crystal display module.

The liquid crystal display module includes a display unit 600 having a liquid crystal display panel 610 for displaying the images.

The display unit 600 includes the liquid crystal display panel 612, a source printed circuit board 620 which is located near the data lines, a source tape carrier package 630 which is located near the data lines, a gate printed circuit board 640 which is located near the gate lines, and a gate tape carrier package 650 which is located near the gate lines.

The liquid crystal display panel 610 comprises a thin film transistor board 612, a color filter board 614 and a liquid crystal (not shown).

The thin film transistor board 612 is a transparent glass substrate on which thin film transistors are formed in matrix. A data line is connected with a source terminal of the thin film transistors and a gate line is connected with a gate terminal of the thin film transistors. Furthermore, pixel electrodes made of Indium Tin Oxide as a transparent and conductive material is formed at a drain terminal of the thin film transistors.

When electric signals are applied to the data line and the gate line, the electric signals are input into the source terminal and the gate terminal of the respective thin film transistor. As the electric signals are input into the thin film transistors, the thin film transistors are respectively turned-on or turned-off, resulting in outputting the electric signals that are required to form pixels to the drain terminals.

The color filter board 614 is provided to face to the thin film transistor board 612. The color filter board 614 has RGB pixels which are formed by a thin film process to present desired colors during the light is passing through the color filter board 614. A surface of the color filter board 614 is covered with common electrodes made of Indium Tin Oxide.

When the electric current is applied to the gate and source terminals of the transistor on the thin film transistor board 612 to turn on the thin film transistor, an electric field is created between the pixel electrodes and common electrodes of the color filter board. This electric field causes to change an array angle of the liquid crystal injected between the thin film transistor board 612 and the color filter board 614, thereby changing light permeability depending on the changed array angle so as to gain a desired pixels.

A driving signal and a timing signal are applied to the gate line and the data line of the thin film transistor in order to control the array angle of the liquid crystal and the timing for the liquid crystal being arranged in the liquid crystal display panel 610.

As shown in FIG. 5, the source tape carrier package 620 that is one of flexible circuit boards, is attached to the source portion of the liquid crystal display panel 610 to decide the time for applying a data driving signal. On the other hand, the gate tape carrier package 640 is attached to the gate portion of the liquid crystal display panel 610 to decide the time for applying a gate driving signal.

The printed circuit boards 620 and 640 are respectively used for applying the driving signal to the gate line and the data line, respectively, upon receiving image signals input from outside of the liquid crystal display panel 610. The printed circuit boards 620 and 640 make contact with the source tape carrier package 630 for the data line and the gate tape carrier package 650 for the gate line in the liquid crystal display panel 610, respectively. A source part is formed on the printed circuit board 620 in order to receive the image signals from an information processing device (not shown) such as a computer, etc. The source part also provides a data driving signal to the liquid crystal display panel 610. A gate part is formed on the printed circuit board 640 to receive the image signals from the information processing device (not shown). The gate part also provides a gate driving signal to the gate line of the liquid crystal display panel 610.

The printed circuit boards 620 and 640 generate the gate driving signal and the data signal, respectively, for driving the liquid crystal display device and the plural timing signals for applying the gate driving signal and the data signal in an acceptable time. Thus, the gate driving signal is applied through the gate tape carrier package 650 to the gate line of the liquid crystal display panel 610, and the data signal is applied through the source tape carrier package 630 to the data line of the liquid crystal display panel 610.

A backlight assembly 700 is disposed under the display unit 600 to uniformly supply the light to the display unit 600. The backlight assembly 700 includes a lamp 710 for generating the light. The lamp 710 is covered with a lamp cover 712.

A light guide plate 720 has a size corresponding to that of the liquid crystal panel 610 of the display unit 600. The light guide plate 720 is disposed under the liquid crystal panel 610 to guide the light generated by the lamp 710 to the display unit 600 while changing the pathway of the light. A plurality of optical sheets 730 is disposed on the light guide plate 720 to achieve uniformity of brightness of the light that is transmitted from the light guide plate 720 to the liquid crystal display panel 610. A light reflecting plate 740 is provided under the light guide plate 720 to reflect the leaking light to the light guide plate 720, thereby increasing the light efficiency.

The display unit 600 and the backlight assembly 700 are supported by a mold frame 800, which is used as a receptacle, as shown in FIG. 5. A chassis 900 is disposed on the display unit 600 to prevent the display unit 600 from being departed from the mold frame 800 while the printed circuit boards 620 and 640 are bent to outside of the mold frame 800 and fixed to the bottom surface of the mold frame 800.

Figure 7:
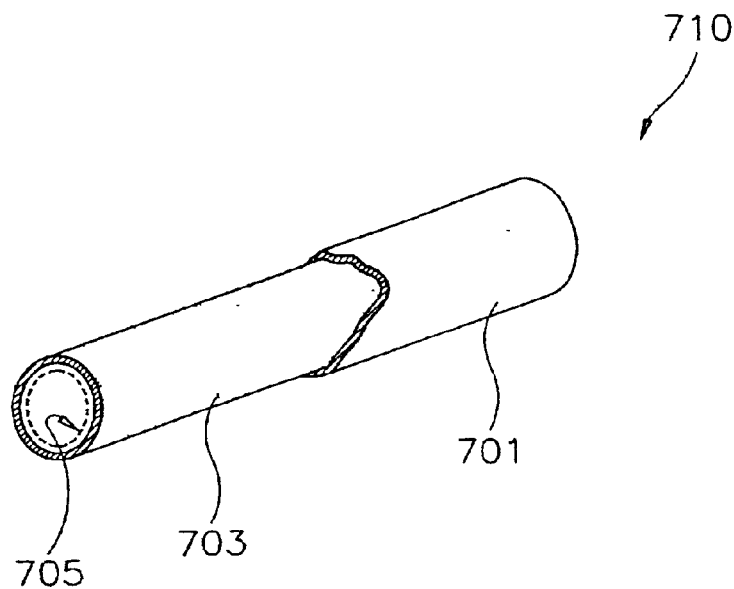
Figure 8:
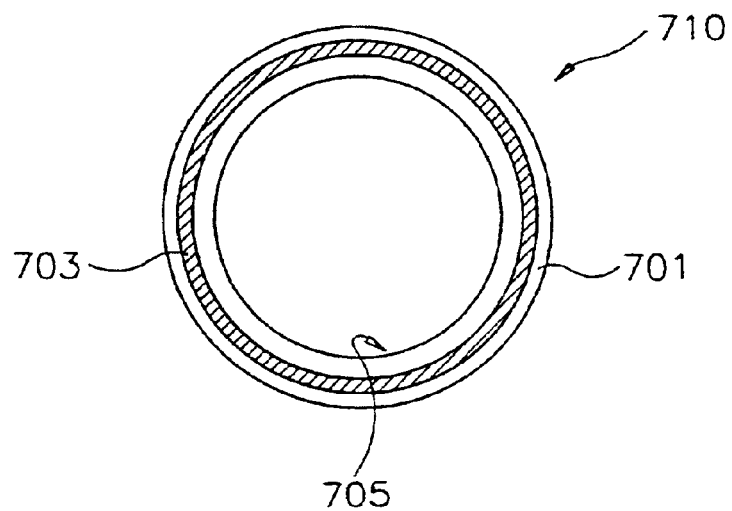
Figure 9:
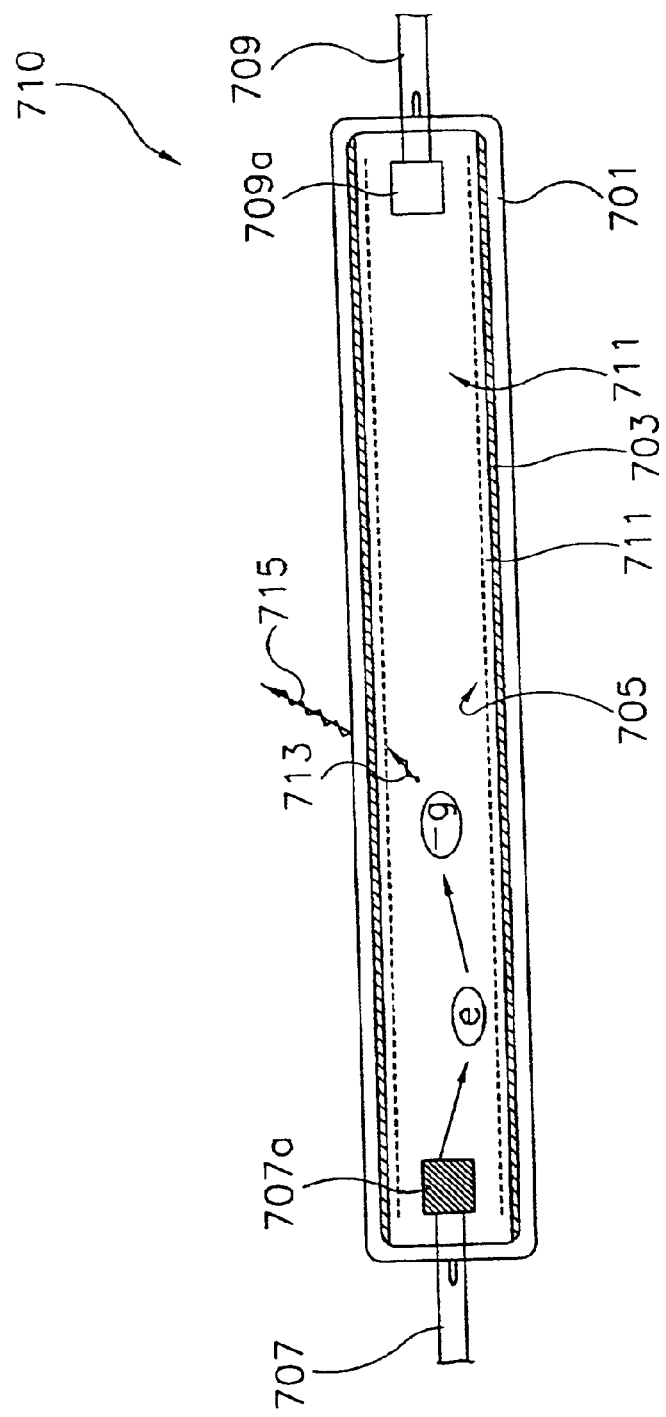

FIGS. 7, 8 and 9 are a perspective view, partly broken away, and sectional views, respectively, showing a construction of the lamp 710 shown in FIG. 6.

As shown in FIGS. 7, 8 and 9, the lamp 710 includes a glass tube 701 that is transparent and filled up with inert gas 711. The first and second electrodes 707 and 709 are disposed at both ends of the glass tube 701, respectively, to receive electric signals that have high voltage and low voltage, respectively, supplied from outside.

The first and second electrodes 707 and 709 are integrated with metal electrodes 707a and 709a, respectively, that are placed in the glass tube 701. The metal electrodes 707a and 709a operate in response to the high and low voltages input applied thereto through the first and second electrodes 707 and 709. When the first and second electrodes 707 and 709 discharge electric current, the inert gas that fills up the glass tube 701 is excited due to the electric discharge of the metal electrodes 707a and 709a and emit ultraviolet rays.

On the other hand, a fluorescent layer 705 made of a fluorescent material or a mixture of fluorescent materials is coated on the inner surface of the glass tube 702 to convert a part of the ultraviolet rays 713, which is emitted during the electric discharge of the lamp 710, into visual rays 715, thereby generating the light.

In addition, the masking film 703 is coated on the inner surface of the glass tube 701 to be placed between the fluorescent layer 705 and the inner surface of the glass tube 701, to cut off particular ultraviolet rays having certain wavelengths in the ultraviolet rays 713.

The masking film 703 comprises a transitional metal oxide (e.g., $TiO_2$, $Y_2O_3$ and $Ce_2O_5$). The masking film 703 can be made of $SiO_2$. The masking film 703 is coated on the inner surface of the glass tube 701 by a thickness of 0.5 to 1 $\mu$m.

When electric current is applied from the outside to the first and second electrodes 707 and 709 and the metal electrodes 707a and 709a start an operation of the electric discharge, the inert gas 711 is excited to generate the ultraviolet rays 713. Some of the ultraviolet rays 713 is converted into the visual rays 715 by the fluorescent layer 705 and then emitted toward the light guide plate 720.

The ultraviolet rays having wavelengths of 253 nm, 313 nm and 365 nm in the rest ultraviolet rays 713 are reflected by the masking film 703 and are not emitted out of the glass tube 701. That is, the rest ultraviolet rays, except for the ultraviolet rays having the wavelengths of 253 nm, 313 nm and 365 nm, and the visual rays having wavelengths of 380 nm to 700 nm are supplied through the glass tube 701 to the light guide plate 720.

Referring to FIG. 6, a masking film 712a can be formed on an inner surface of the lamp cover 712 for covering and protecting the lamp 710. In this case, the lamp cover 712 functions not only as a protection device for the lamp 710 but also as a light reflecting plate which is similar to the light reflecting plate 740 disposed under the light guide plate 720. The ultraviolet rays having the wavelengths of 253 nm, 313 nm, 365 nm in the light emitted from the lamp 710 are firstly cut off by means of the masking film 703 coated on the inner surface of the glass tube 701 and then secondary broken by means of the masking film 712a coated on the inner surface of the lamp cover 712. The masking film 712a coated on the inner surface of the lamp cover 712 can be the same material as that of the masking film 703 formed on the inner surface of the glass tube 701.

Figure 10:
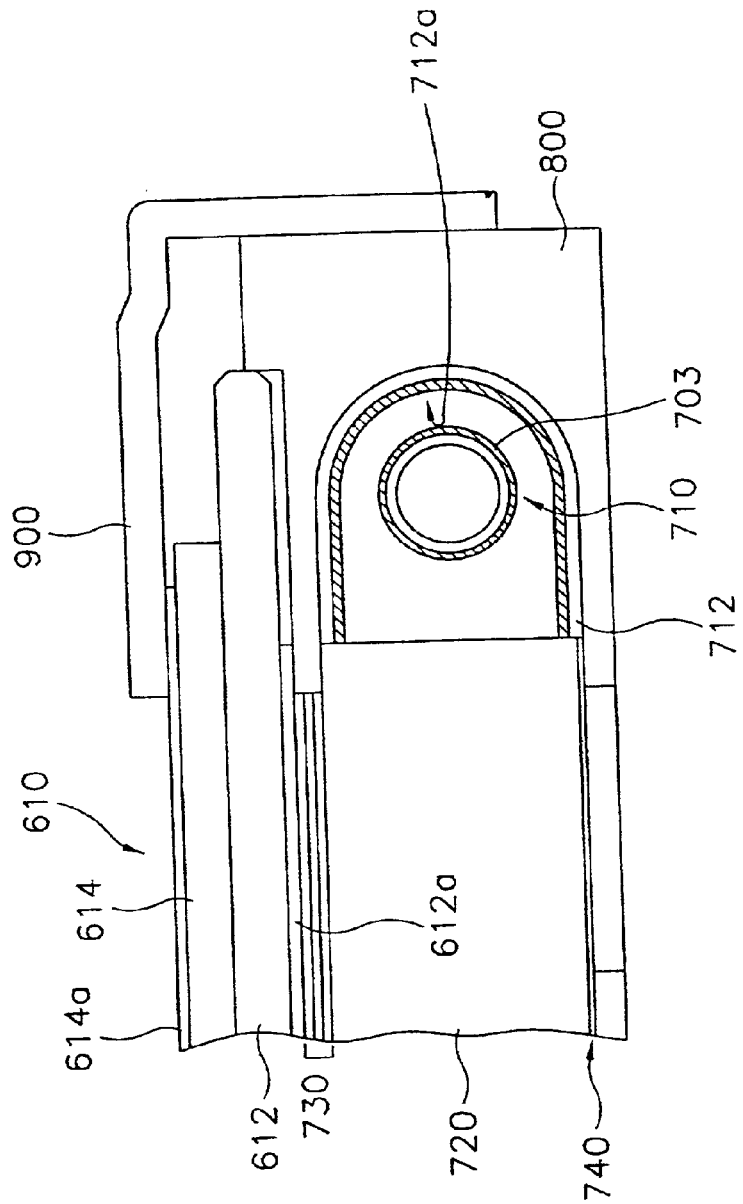

The masking film 703 can be coated on the outer surface of the glass tube 701 of the lamp 710. Hereinafter, an example of coating the masking film on the outer surface of the glass tube will be described in detail with reference to FIGS. 10, 11, 12 and 13. As shown in FIG. 10, the structure elements and the combination construction of the liquid crystal display device are the same as those of the liquid crystal display device as shown in FIG. 6, except that the masking film 703 is coated on the outer surface of the glass tube.

Figure 11:
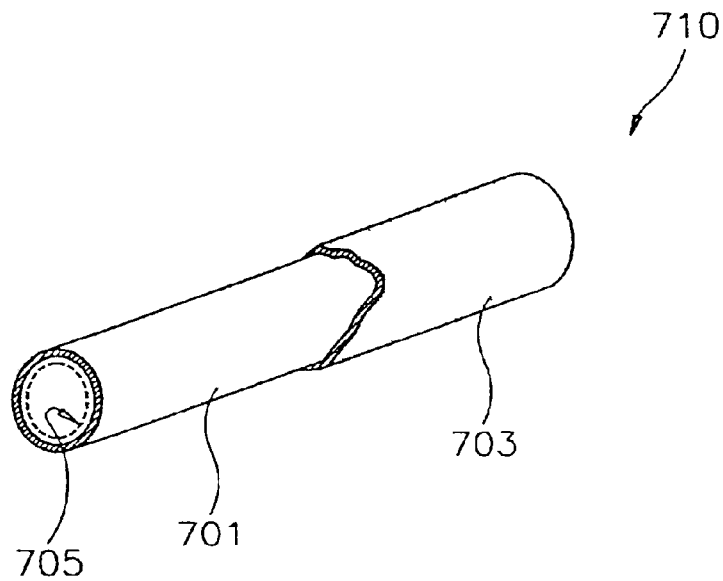
Figure 12:
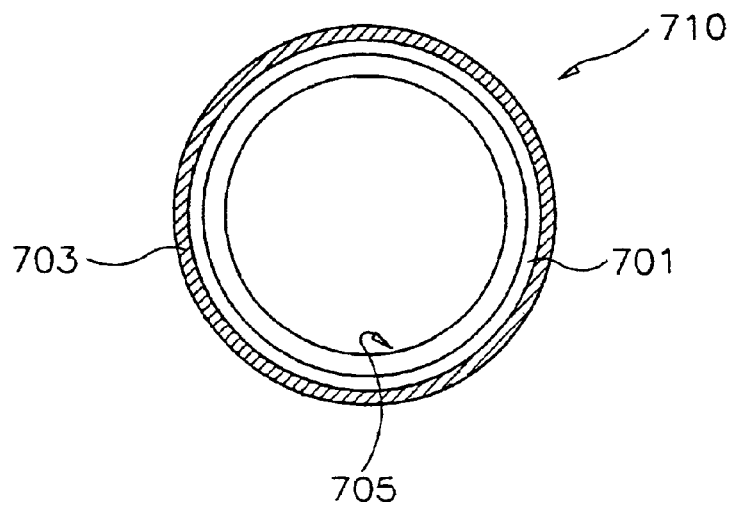
Figure 13:
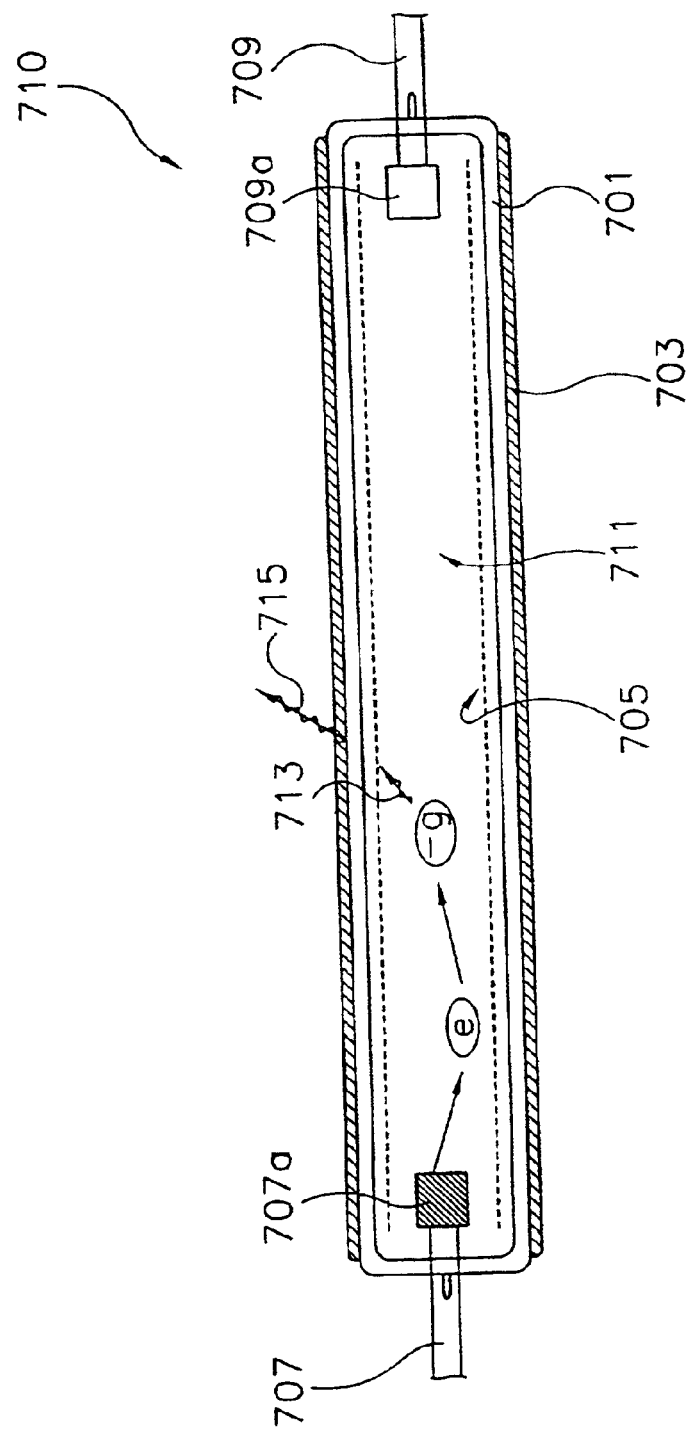

FIGS. 11, 12 and 13 are a perspective view, partly broken away, and sectional views showing a construction of the lamp 710, respectively, shown in FIG. 6 in more detail.

As shown in FIGS. 11, 12 and 13, the first and second electrodes 707 and 709 are disposed at both ends of the glass tube 701, respectively, in which the inert gas 711 is filled up, so as to receive electric signals having high and low voltages from the outside, respectively.

The first and second electrodes 707 and 709 are integrated with the metal electrodes 707a and 709a, respectively, in the glass tube 701. The metal electrodes 707a and 709a electrically discharge in response to the high and low voltages supplied through the first and second electrodes 707 and 709 thereto. The inert gas 711 that fills up the glass tube 701 emits the ultraviolet rays 713 as the metal electrodes 707a and 709a are excited due to the electric discharge thereof.

On the other hand, a fluorescent layer 705 is coated on the inner surface of the glass tube 701 to convert the part of the ultraviolet rays in the light emitted from the lamp 710 into the visual rays 715, and to generate light.

In addition, the masking film 703 is coated on the outer surface of the glass tube 701 in order to prevent the part of the ultraviolet rays 713 in the light emitted from the lamp 710 from being incidence to the light guide plate 720.

The masking film 703 can be made of transitional metal oxide (e.g., $TiO_2$, $Y_2O_3$ or $Ce_2O_5$) or $SiO_2$. The masking film 703 is coated on the inner surface of the glass tube 701 by a thickness of about 0.5 $\mu$m to about 1 $\mu$m. When the masking film 703 is coated on the outer surface of the glass tube 701 as shown in FIG. 11, the masking film 712a may be formed on an inner surface of the lamp cover 712. The masking film 703 coated on the outer surface of the glass tube 701 and the masking film 712a formed on the inner surface of the lamp cover 712 cut off the ultraviolet rays which have the wavelengths of 253 nm, 313 nm and 365 nm in the light emitted from the glass tube 701. The masking film 712a coated on the inner surface of the lamp cover 712 can be made of the same material as that of the masking film 703 formed on the outer surface of the glass tube 701.

When the first and second electrodes 707 and 709 discharge the electric current, the inert gas 711 is excited and generate the ultraviolet rays 713. The ultraviolet rays having the wavelengths of 253 nm, 313 nm and 365 nm are absorbed by the masking film 703. Accordingly, some ultraviolet rays, except for the ultraviolet rays having the wavelengths of 253 nm, 313 nm and 365 nm, and the visual rays having wavelengths of 380 nm and 700 nm are supplied to the light guide plate 720.

FIGS. 14, 15, 16 and 17 are views of showing the lamp and the backlight assembly to which the masking films shown in FIGS. 6, 7, 8, 9, 10, 11, 12 and 13 are adapted.

As shown in FIGS. 14 to 17, the first and second electrodes 707 and 709 are disposed at both ends of the glass tube 701, respectively, to receive electric signals having high and low voltages from the outside. The glass tube 701 is filled up with the inert gas 711.

The first and second electrodes 707 and 709 are integrated with the metal electrodes 707a and 709a, respectively, in the glass tube 701. The metal electrodes 707a and 709a electrically discharge in response to the high and low voltages supplied thereto through the first and second electrodes 707 and 709. The inert gas 711 that fills up the glass tube 701 emits the ultraviolet rays 713 as the metal electrodes 707a and 709a are excited by the electric discharge thereof.

On the other hand, a fluorescent layer 705 is coated on the inner surface of the glass tube 701 to convert the part of the ultraviolet rays in the light emitted from the lamp 710 into the visual rays 715, thereby causing to generate light.

In addition, the masking film 703 is coated on the inner surface of the glass tube 701 to be placed between the fluorescent layer 705 and the glass tube 701, and the masking film 703a is coated on the outer surface of the glass tube 701 to cut off the part of the ultraviolet rays 713 in the light emitted from the lamp 710.

Figure 14:
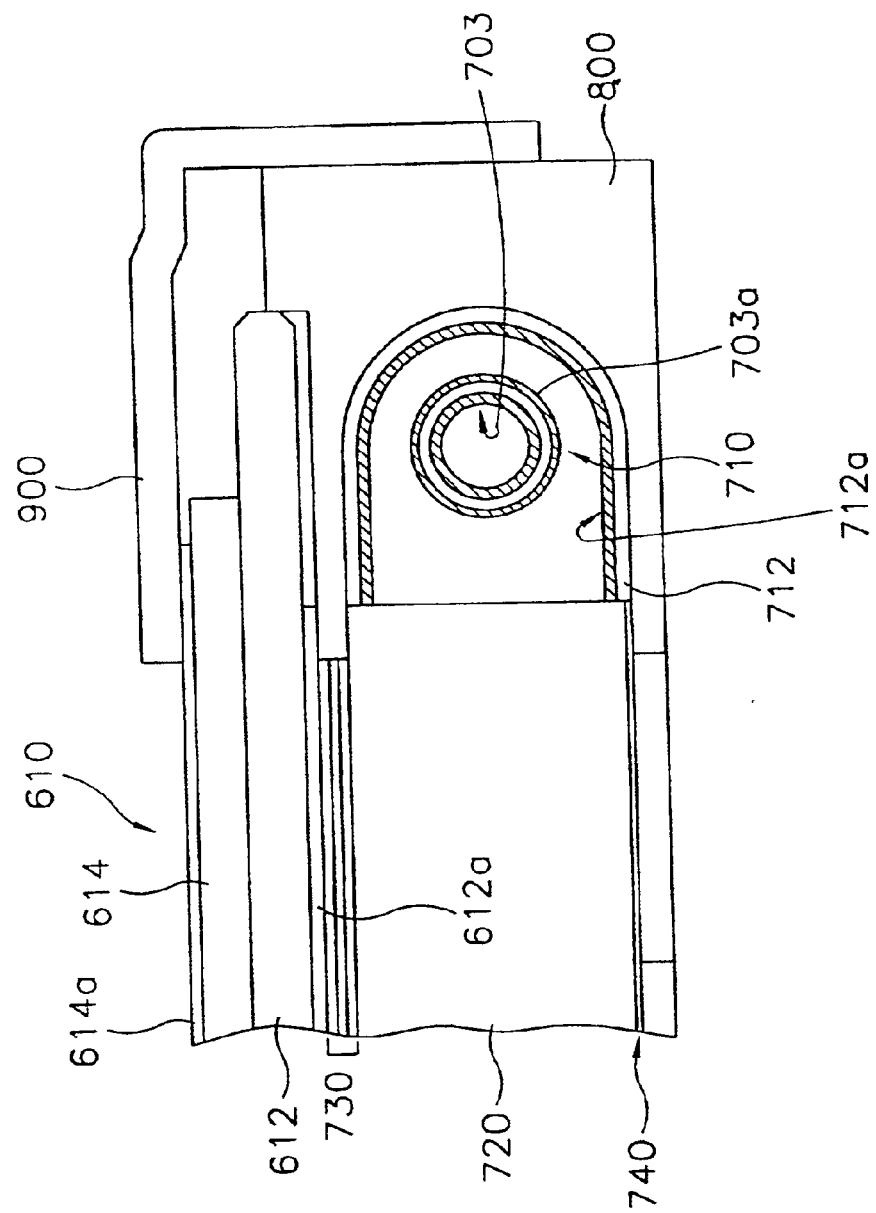
Figure 15:
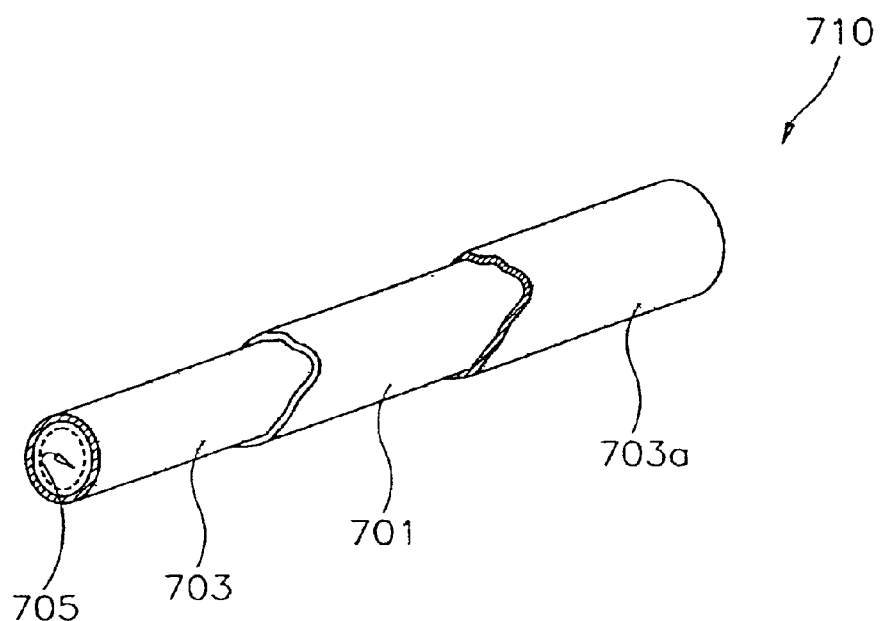
Figure 16:
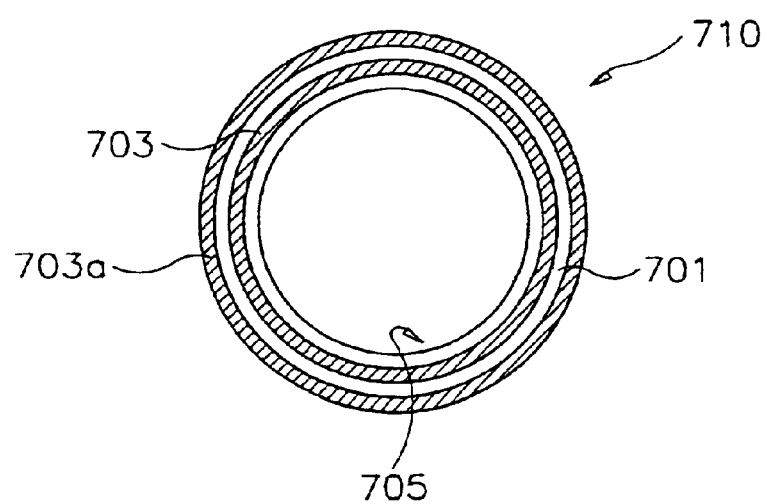
Figure 17:
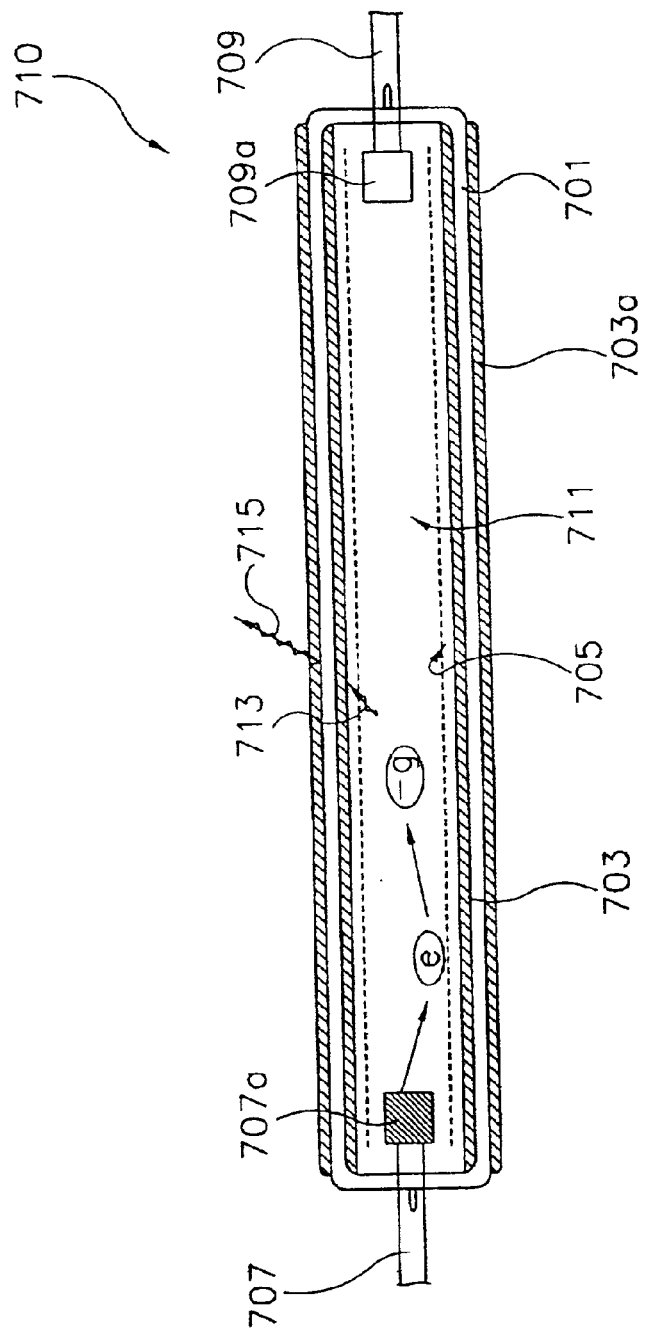

The masking films 703 and 703a are preferably made of transitional metal oxide (e.g., $TiO_2$, $Y_2O_3$ or $Ce_2O_5$) or $SiO_2$. When the masking films 703 and 703a are coated on inner and outer surfaces of the glass tube 701 as shown in FIG. 14, the masking film 712a may be further formed on an inner surface of the lamp cover 712. The masking films 703 and 703a coated on the inner and outer surfaces of the glass tube 701 and the masking film 712a formed on the inner surface of the lamp cover 712 cut off the ultraviolet rays having the wavelengths of 253 nm, 313 nm and 365 nm in the light emitted from the lamp 710. The masking film 712a coated on the inner surface of the lamp cover 712 can be made of the same materials as those of the masking films 703 and 703a formed on the inner and outer surfaces of the glass tube 701.

When the first and second electrodes 707 and 709 discharge the electric current, the inert gas 711 is excited and generates the ultraviolet rays 713. The ultraviolet rays having the wavelengths of 253 nm, 313 nm and 365 nm are absorbed by the masking films 703 and 703a and the masking film 712a. Accordingly, some ultraviolet rays, except for the ultraviolet rays having the wavelengths of 253 nm, 313 nm and 365 nm, and the visual rays having wavelengths of 380 nm and 700 nm are selectively supplied to the light guide plate 720.

The masking films 703, 703a and 712a cut off some of the ultraviolet rays in the light emitted from the lamp 710, which causes to discolor the light guide plate in yellow. Accordingly, the masking films 703, 703a and 712a are not coated on the inner and outer surfaces of the glass tube 701 of the lamp 710. Thus, if it is possible to prevent the ultraviolet rays which causes discoloration of the light guide plate 720 into yellow from being supplied to the light guide plate 720, the masking film 703 can be placed at a position in the pathway through which that the light generated by the lamp 701 of the liquid crystal display device is transmitted to the display unit 600, regardless of a certain position.

Figure 18:
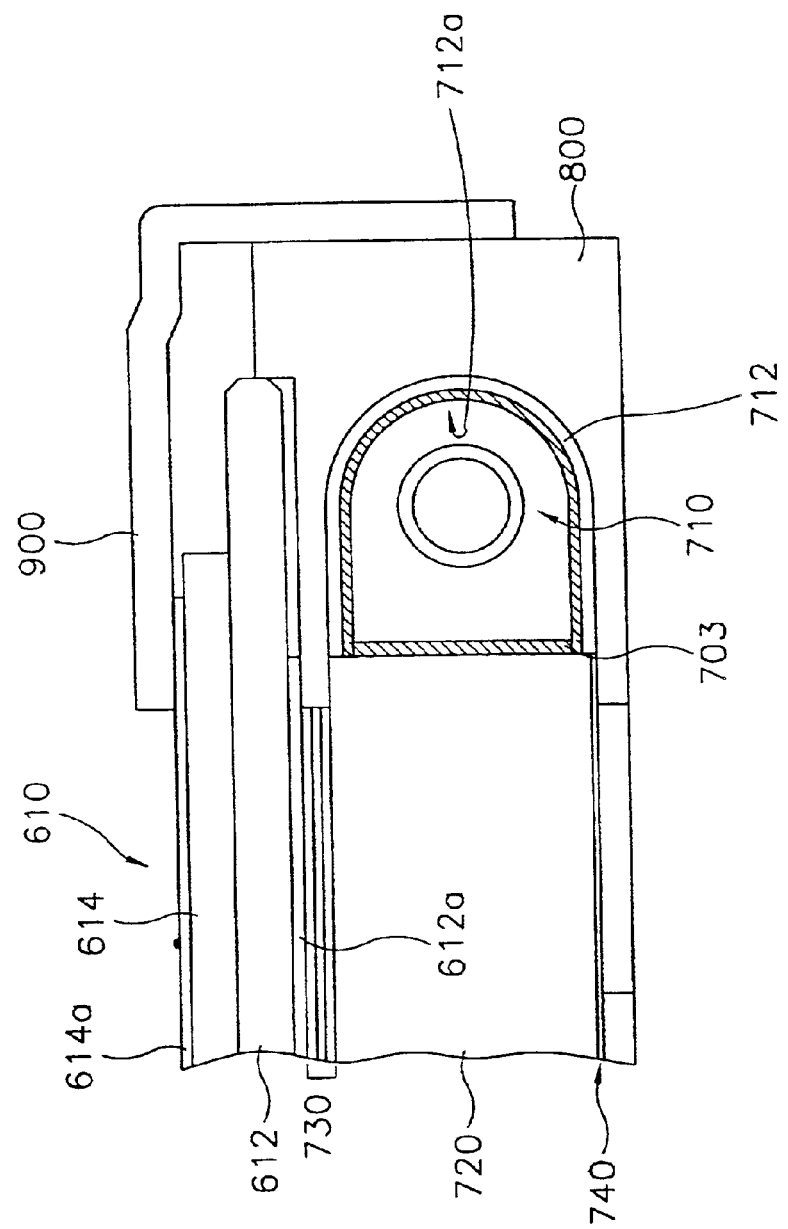
Figure 19:
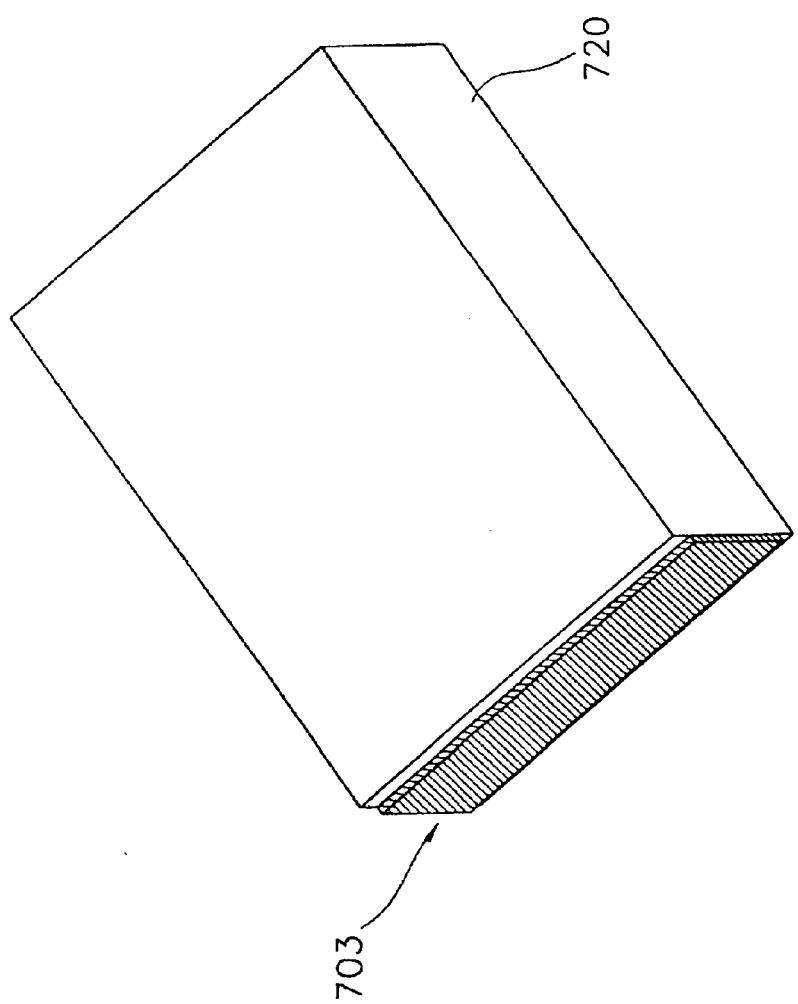
Figure 20:
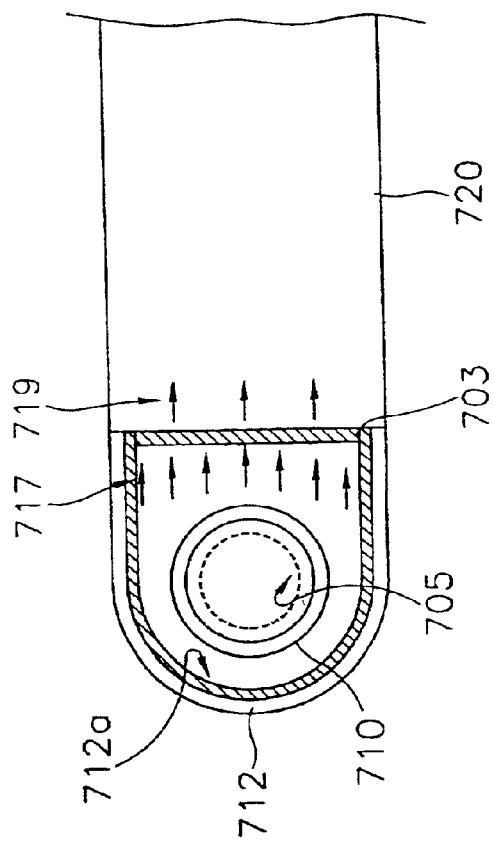

FIGS. 18, 19 and 20 are views of showing a construction of the light guide plate 720, in which the masking film is coated on a light incidence surface of the light guide plate 720 through which the light emitted from the lamp 710 is transmitted to the light guide plate 720.

As shown in FIG. 18, the structure elements and the combination construction thereof in the liquid crystal display device are the same as those of the liquid crystal display device shown in FIG. 6, except for the position of the masking film 703.

FIGS. 19 and 20 are a perspective view and a sectional view, respectively, showing the construction of the masking film 703 and the light guide plate 720 shown in FIG. 18 in detail.

Referring to FIGS. 19 and 20, the masking film 703 is entirely coated on the light incidence surface of the light guide plate 720, except for an upper end portion and a lower end portion of the light incidence surface of the light guide plate 720. The lamp cover 712 for protecting the lamp 710 is mounted on the light guide plate 720 with the edge portion of the lamp cover 712 closely making contact with the upper end portion and the lower end portion of the light guide plate 712. Thus, the light emitted from the lamp 710 passes through the masking film 703 to be incident into the light guide plate 720. The masking film 703 coated on the light incidence surface of the light guide plate 720 is made of a transitional metal oxide (e.g., $TiO_2$, $Y_2O_3$ or $Ce_2O_5$) or $SiO_2$. The masking film 703 is coated on the light incidence surface of the light guide plate 720 by a thickness of about 0.5 μm to about 1 μm.

When the electric signals having the high and low voltages are input from the outside to the first and second electrodes 707 and 709 disposed at both ends of the glass tube 701, which is filled up with the inert gas, the electric discharge takes place in the glass tube 701. When the first and second electrodes 707 and 709 discharge the electricity, the inert gas 711 is excited and generates the ultraviolet rays in the glass tube 701.

Some of the ultraviolet rays is converted into the visual rays by the fluorescent layer 705 coated on the inner surface of the glass tube 701 and emitted outwardly from the glass tube 701. The light 717 including the ultraviolet rays and the visual rays, which is emitted from the lamp 710, passes through the masking film 703 coated on the light incidence surface of the light guide plate 720 and approaches to the light guide plate 720.

At that time, the ultraviolet rays having the wavelengths of 253 nm, 313 nm and 365 nm are absorbed by the masking film 703. Thus, a light 719 which includes some ultraviolet rays, except for the ultraviolet rays having the wavelengths of 253 nm, 313 nm and 365 nm, and the visual rays having wavelengths of 380 nm and 700 nm are only supplied to the light guide plate 720.

As shown in FIGS. 19 and 20, even though the masking film 703 is formed on the light incidence surface of the light guide plate 720, the masking film 712a may be further coated on the inner surface of the lamp cover 712. The masking film 712a coated on the inner surface of the lamp cover 712 can be made of the same material as that of the masking film 703 coated on the light incidence surface of the light guide plate 720.

Figure 21:
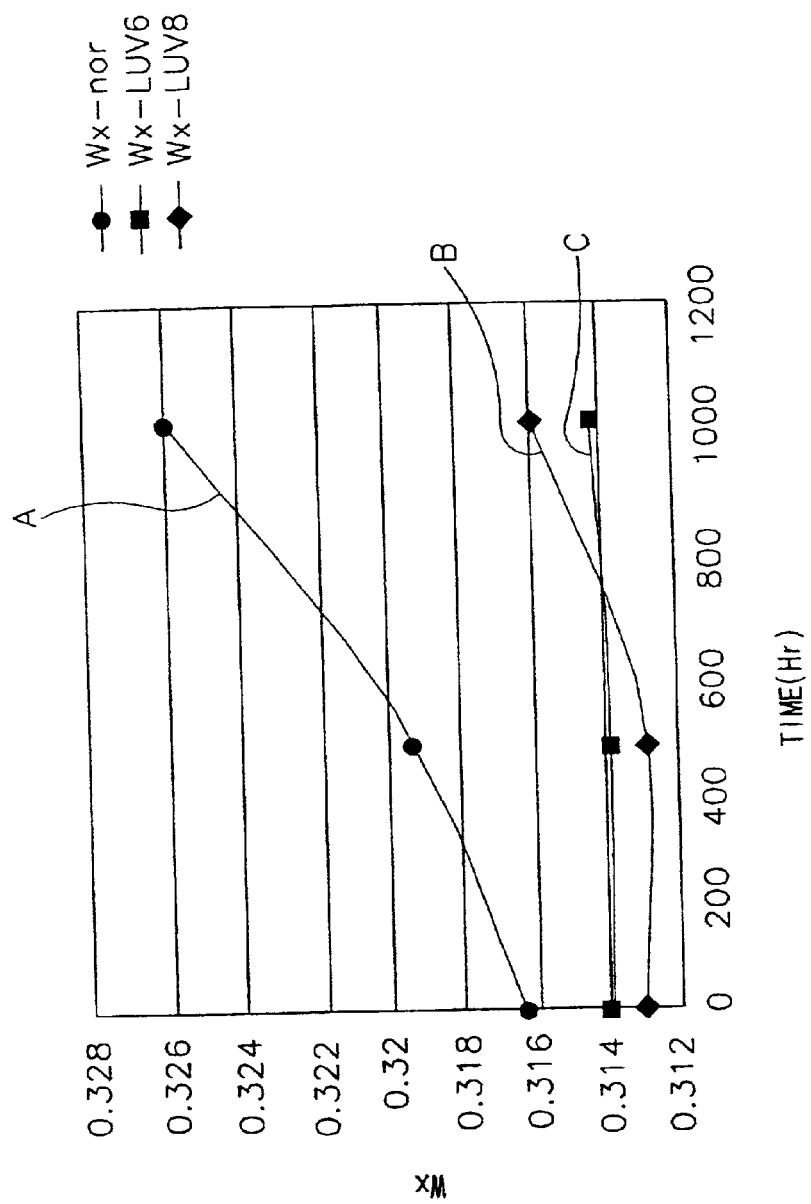
FIGS. 21 and 22 are graphs showing discoloration states of the light guide plates of the conventional art and the present invention shown in FIGS. 6 through 20 in a lapse of the time.
Figure 22:
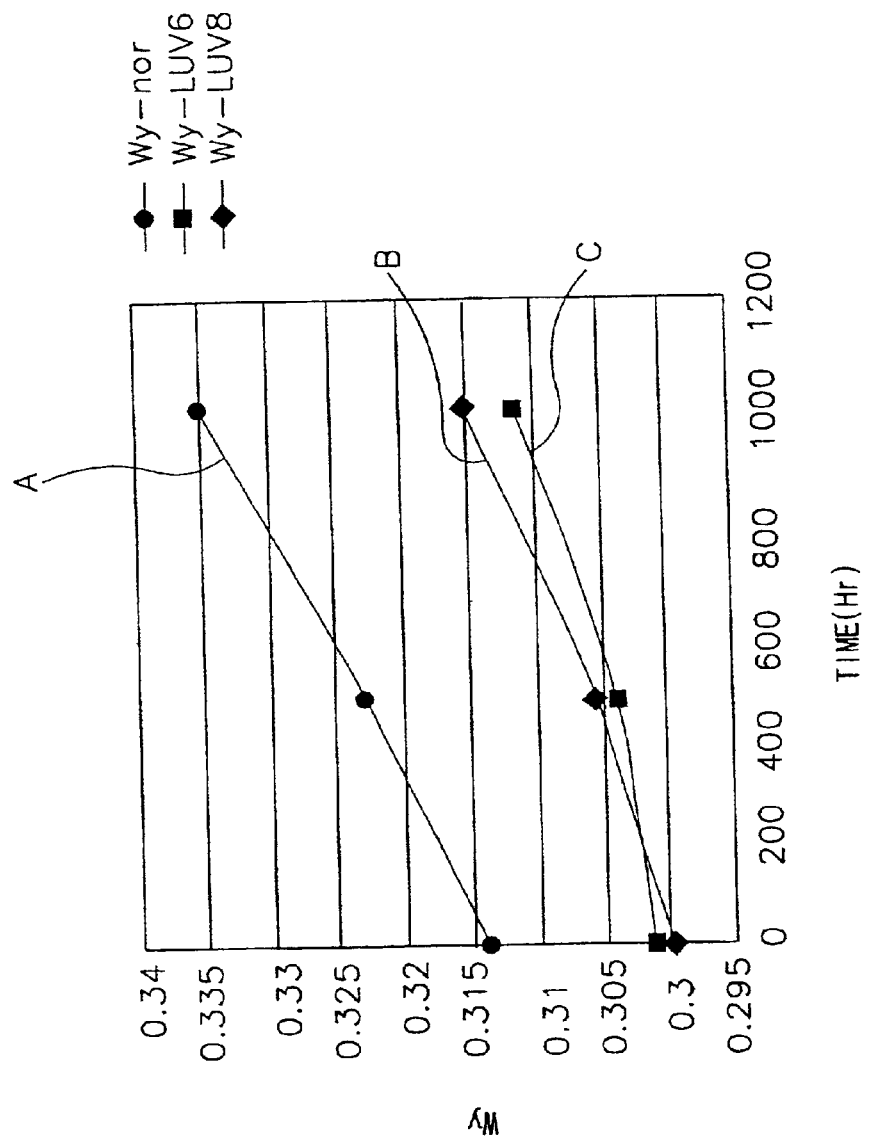

FIGS. 21 and 22 are graphs comparatively showing discoloration of the light guide plates of the conventional art and the present invention in a lapse of the time.

FIGS. 21 and 22 are graphs respectively showing discoloration states of types A, B and C, in which the type A is the COP light guide plate on which the masking film is not coated at all and the types B and C are the COP light guide plates on which at least one masking film is coated in a pathway of the light. In the types B and C of the COP light guide plates, electric current of 6 mA is applied to the lamp 710 in the type B of the light guide plate and electric current of 8 mA is applied to the lamp 710 in the type C of the light guide plate.

As shown in FIGS. 21 and 22, when the types A, B and C of the COP light guide plates were aged at an ordinary temperature for 1000 hours, changes ΔX and ΔY of the discoloration in the type A of the COP light guide plate, on which the masking film is not coated, were 0.01 and 0.021, respectively, on the color coordinates. Meanwhile, changes ΔX and ΔY of the discoloration in the types B and C of the COP light guide plates, on which at least one of masking film is coated are as follows.

In the type B of the COP light guide plate having the lamp to which the electric current of 6 mA is applied, the change ΔX of the discoloration on an X coordinate was nearly zero and the change ΔY of the discoloration on a Y coordinate was 0.002. In the type C of the COP light guide plate having the lamp to which the electric current of 8 mA is applied, the changes ΔX and ΔY of the discoloration approached 0.003 and 0.015, respectively, on the color coordinates. According to the aging test, even though the light guide plate 720 of the backlight assembly, on which the masking film 703 is coated to mask the ultraviolet rays having particular wavelengths in the light emitted from the lamp 710, is used for a long time, the light guide plate is not subjected to the discoloration.

Figure 23:
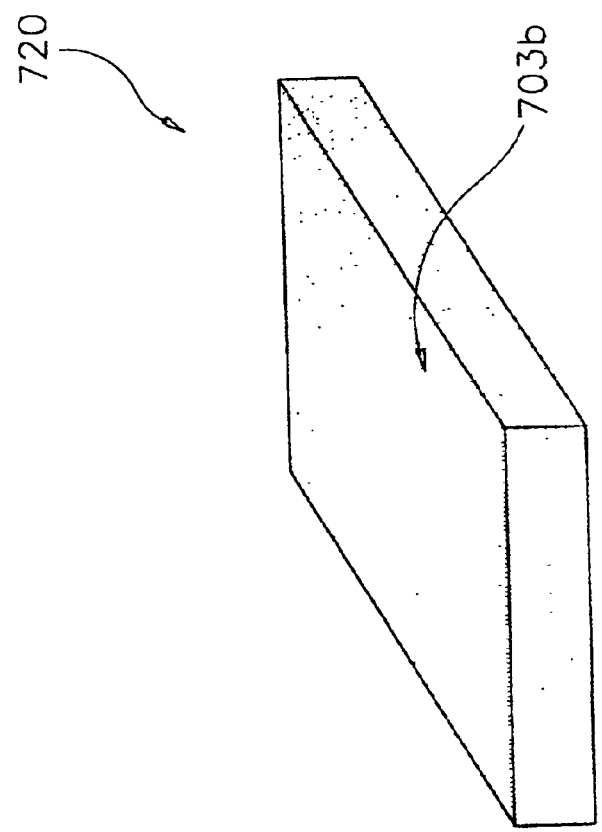
FIGS. 23 and 24 are views showing another example of the constructions of the lamp in the backlight assembly shown in FIG. 6.
Figure 24:
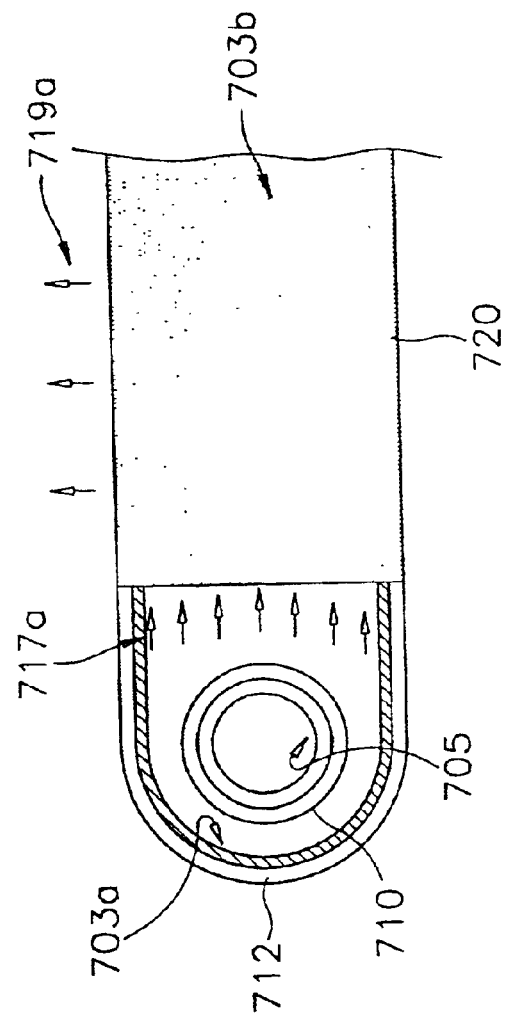

Thus, even if the ultraviolet rays having the particular wavelengths, which cause discoloration of the light guide plate 720 into yellow, are supplied to the light guide plate 720, it is possible to prevent the light guide plate from being discolored into yellow when the light guide plate 720 absorbs the ultraviolet rays causing the discoloration of the light guide plate 720. FIGS. 23 and 24 shows several examples of the light guide plate preventing the discoloration thereof.

When the COP light guide plate 720 is manufactured of mixture of at least one of polyolefin resin composition and a resin for a light guide plate, a transitional metal oxide ($TiO_2$, $Y_2O_3$ or $Ce_2O_5$) is added to the mixture to make the light guide plate 720.

Furthermore, any one of 2-(e⁻-hydroxy-5-methlyphenol)-benzotriazole and p-phenylene-bis (1,3-benzoxizine)-4-5 NE, which are benzene derivatives, can also be added to the mixture substituting for the transitional metal oxides As a result, it is possible to manufacture the light guide plate 720 including isolation material 703b for absorbing the ultraviolet rays having the particular wavelengths of 253 nm, 313 nm and 365 nm, as shown in FIG. 23. The backlight assembly to which the light guide plate 720 having the isolation material 703b is adopted is shown in FIG. 24.

When the electric discharge is generated in the lamp 720, the inert gas 711 in the lamp 720 is excited and generate the ultraviolet rays. Some of the ultraviolet rays are converted into the visual rays by the fluorescent layer 705 coated on the inner surface of the glass tube 701 and the visual rays are emitted from the glass tube along with the ultraviolet rays. The light 717a emitted from the lamp 710, which include the ultraviolet rays and the visual rays, is incident into the light guide plate 720 while the ultraviolet rays having the wavelengths of 253 nm, 313 nm and 365 nm are absorbed by the isolation material 703b added to the light guide plate 720. Accordingly, only the light 719a which includes the ultraviolet rays, except for the ultraviolet rays having the wavelengths of 253 nm, 313 nm and 365 nm, and the visual rays having the wavelengths of 380 nm and 700 nm are supplied from the light guide plate 720 to the display unit 600.

As shown in FIG. 24, when manufacturing the light guide plate 720 by mixing the isolation material 703b with resin, the masking film 712a can be coated on the inner surface of the lamp cover 712. The masking film 712a coated on the lamp cover 712 can be made of the same material as the isolation material 703b added to the light guide plate 720.

Figure 25:
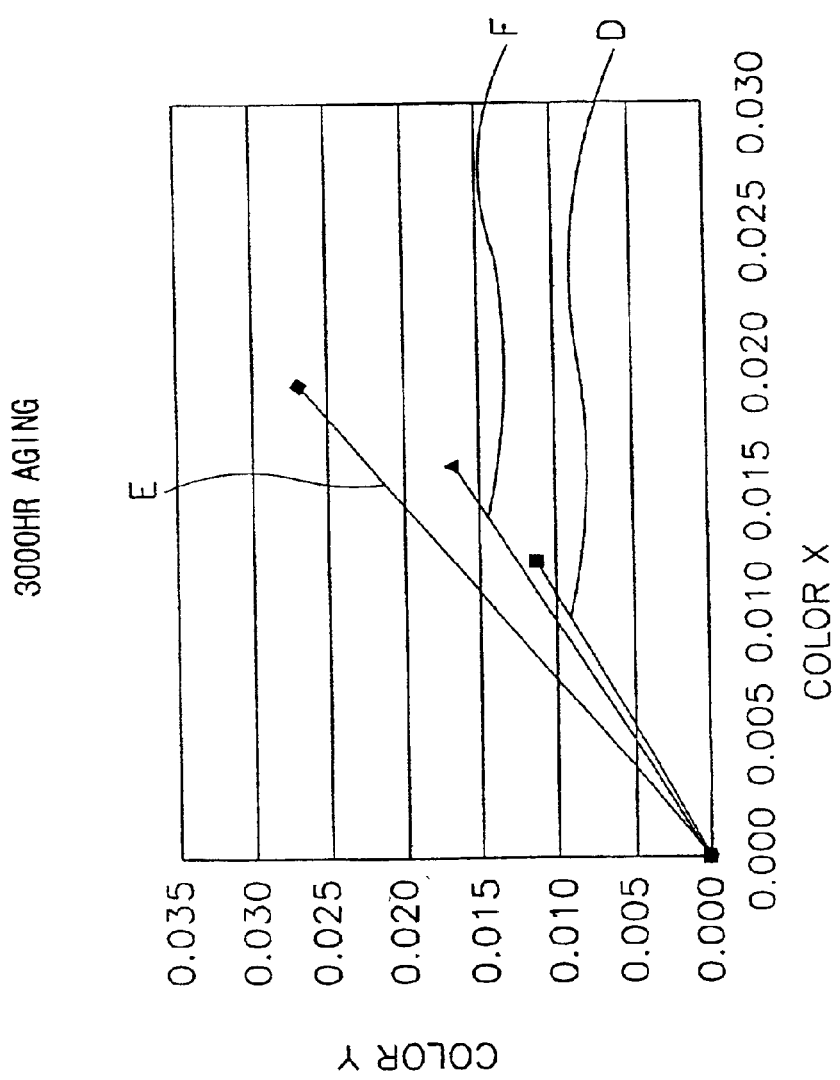
FIG. 25 is a graph showing discoloration states of the light guide plates of the conventional art and the present invention shown in FIG. 23 in a lapse of the time.

FIG. 25 is a graph of showing the discoloration of a type D of a COP light guide plate having the isolation material 703b added thereto, a type E of a COP light guide plate having no isolation material 703b and a type F of a PMMA light guide plate.

As shown in FIG. 25, when the types D and E of the COP light guide plates and the type F of the PMMA light guide plate were aged at an ordinary temperature for 3300 hours, the changes $\Delta X$ and $\Delta Y$ of the discoloration in the type E of the COP light guide plate, to which the isolation material is not added, were 0.02 and 0.027, respectively, on the color coordinates. And, the changes $\Delta X$ and $\Delta Y$ of the discoloration in the type D of the PMMA light guide plate were 0.017 and 0.017, respectively, on the color coordinates. However, the changes $\Delta X$ and $\Delta Y$ of the discoloration in the type D of the COP light guide plates, to which the isolation material is added, were 0.012 and 0.012, respectively, on the color coordinates. According to the aging test, when the COP light guide plate, which is easy to be discolored by the ultraviolet rays, is made of the mixture of the resin and the transitional metal oxide or benzene derivative used as the isolation material, the ultraviolet rays causing to discolor the light guide plate in yellow is cut off by the isolation material so that the light guide plate is prevented from being discolored.

Figure 26:
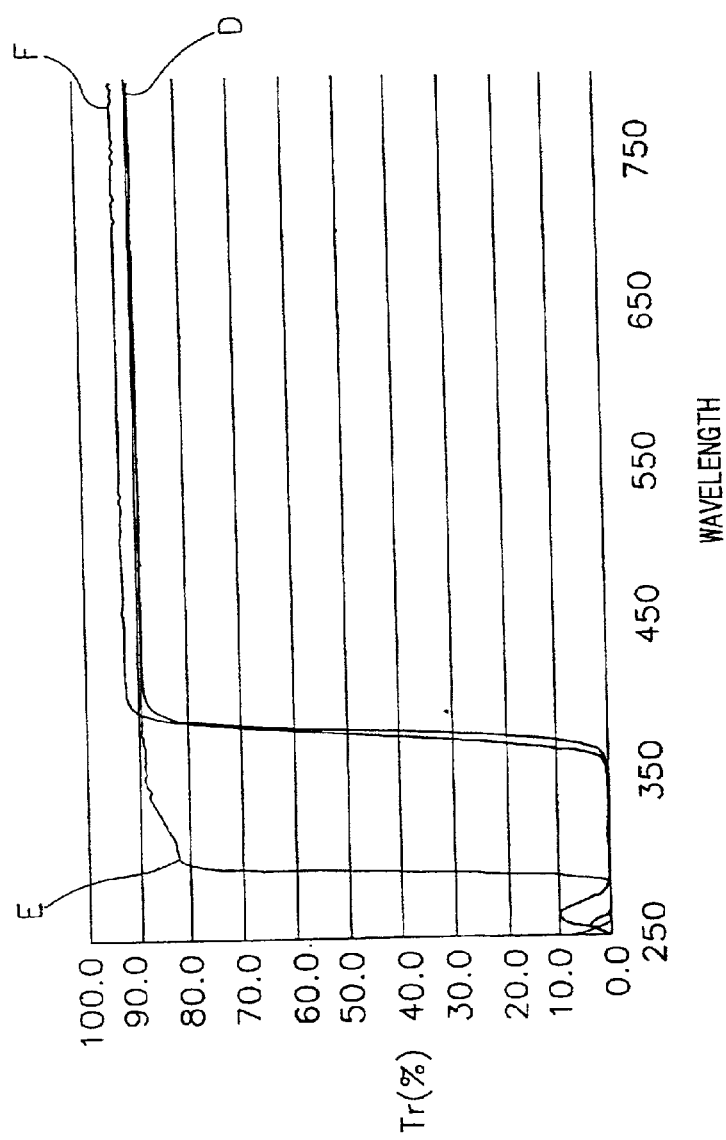
FIG. 26 is a graph showing a transmission characteristic of ultraviolet rays in a conventional light guide plate and a light guide plate shown in FIG. 23.
Figure 27:
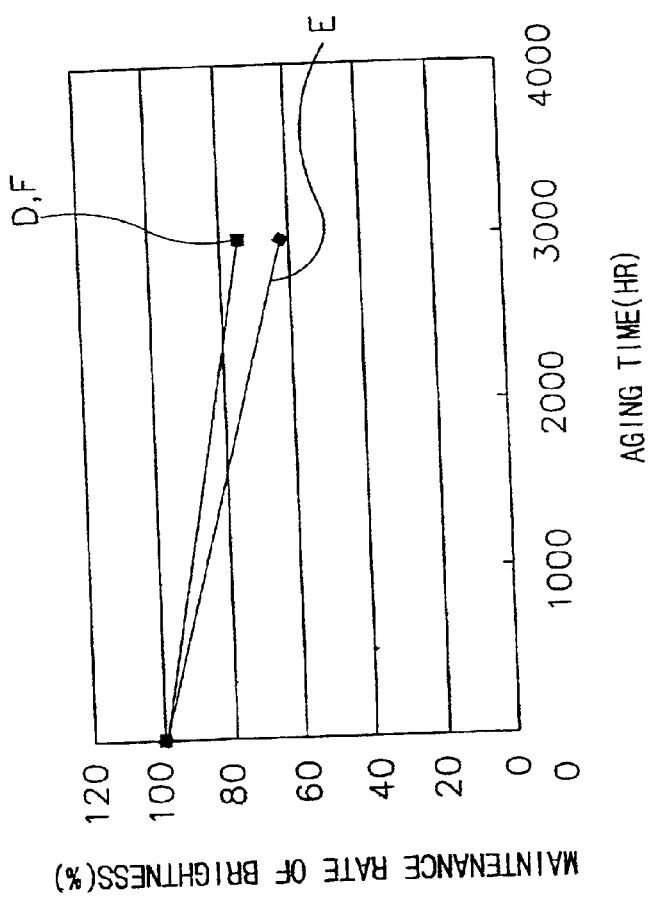
FIG. 27 is a graph showing maintenance rates of brightness for a COP light guide plate shown in FIG. 23.

FIG. 26 is a graph of showing an isolation area of the ultraviolet rays of a type D of a COP light guide plate having the isolation material 703b, a type E of a COP light guide plate having no isolation material 703b and a type F of a PMMA light guide plate. FIG. 27 is a graph of showing a maintenance rate of brightness of a type D of a COP light guide plate having the isolation material 703b, a type E of a COP light guide plate having no isolation material 703b and a type F of a PMMA light guide plate.

As shown in FIG. 26, the ultraviolet rays, which have the wavelengths of 253 nm, 313 nm and 365 nm and causing discoloration the light guide plate into yellow, are cut off from the display unit 600 in a type D of a COP light guide plate having the isolation material 703b and a type F of a PMMA light guide plate. Besides, referring to FIG. 27, a maintenance rate of brightness for the type D of a COP light guide plate having the isolation material 703b and the type F of a PMMA light guide plate is 70% or more, on the other hand, the maintenance rate of brightness for the COP light guide plate is about 60%.

Although the embodiments of the masking films for masking the ultraviolet rays causing discoloration of the light guide plate 720 into yellow have been described with reference to FIGS. 6 through 27, the masking film should not be limited to the embodiments. That is, all of the masking film coated on the inner and outer surfaces of the glass tube 701, the masking film coated on the light incidence surface of the light guide plate 720, the light guide plate made of the mixture of the resin and the transitional metal oxide, and the masking film coated on the inner surface of the lamp cover 721 can be applied to an backlight assembly together.

According to the light source device, the backlight assembly and the liquid crystal display device, at least one of the masking film that is made of the transitional metal oxide and can cut off the ultraviolet rays in the light, is placed in the pathway in that the light generated by the lamp is supplied to the display unit for displaying images.

Accordingly, it is possible to prevent the ultraviolet rays having the particular wavelengths, which cause to discolor the light guide plate made of the polyolefin resin composition, from being supplied to the light guide plate. Therefore, the light guide plate, which is made of the polyolefin resin composition widely used to make it light in weight and small in size, can be prevented from discolored in yellow.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A backlight assembly comprising:
   means for generating light in response to an electric current applied to an electrode disposed in a glass tube, said glass tube being filled up with a gas filler and including a mixture layer having fluorescence material therein;

means for guiding the light;

means for displaying an image in response to the light transmitted from the light guiding means; and means for masking a part of ultraviolet rays in the light, said masking means being mounted in a pathway through which the light emitted by the light generating means is supplied to the image displaying means.

2. The backlight assembly as claimed in claim 1, wherein the masking means are disposed on at least one of an inner surface of the glass tube between the mixture layer and the glass tube, an outer surface of the glass tube and a light incidence surface of the light guiding means in which the light emitted by the light generating means.

3. The backlight assembly as claimed in claim 2, wherein the masking means are coated on the glass tube has a thickness range of about 0.5 $\mu$m to about 1 $\mu$m.

4. The backlight assembly as claimed in claim 1, wherein the masking means comprise a transition metal oxide.

5. The backlight assembly as claimed in claim 4, wherein the transition metal oxide is one selected from the group consisting of $TiO_2$, $Y_2O_3$ and $Ce_2O_5$.

6. The backlight assembly as claimed in claim 1, wherein the masking means omprise $SiO_2$.

7. The backlight assembly as claimed in claim 1, wherein the masking means cut off ultraviolet rays having wavelengths of 253 nm, 313 nm and 365 nm.

8. The backlight assembly as claimed in claim 1, further comprising means, having an opening opposite to the light incidence surface of the light guiding means, for receiving and protecting the light generating means, and the masking means being formed on an inner surface thereof.

9. The backlight assembly as claimed in claim 1, wherein the light guiding means comprise at least one polyolefin resin composition.

10. The backlight assembly as claimed in claim 9, wherein the light guiding means are formed by mixing the polyolefin resin with one selected from the group consisting of $TiO_2$, $Y_2O_3$, $Ce_2O_5$ and $SiO_2$.

11. The backlight assembly as claimed in claim 9, wherein the light guiding means are formed by mixing the polyolefin resin with a benzene derivative.

12. The backlight assembly as claimed in claim 9, wherein the benzene derivative is 2-(e⁻-hydroxy-5-methylphenol)-benzotriazole or p-phenylene-bis (1,3-benzoxizine)-4-5ne.

13. A liquid crystal display device comprising:

a lamp unit for generating light in response to an electric current applied to an electrode which is disposed in a glass tube, said glass tube being filled up with a glass filler and having a mixture layer of a fluorescence material therein;

a light guiding unit for guiding the light;

a display unit for displaying an image in response to the light transmitted from the light guiding means;

masking means for cutting off a part of ultraviolet rays in the light, the masking means being mounted in a pathway through which the light emitted by the light generating means is supplied to the image displaying means;

a receiving unit for receiving the lamp unit and the light guiding unit; and a top chassis for adjusting a position of the display unit and for fixing the display unit to the receiving unit by being assembled to face to the receiving unit.

14. The liquid crystal display device as claimed in claim 13, wherein the masking means are disposed on at least one of an inner surface of the glass tube between the mixture layer and the glass tube, an outer surface of the glass tube and a light incidence surface of the light guiding unit in which the light emitted by the light generating unit is incidence.

15. The liquid crystal display device as claimed in claim 14, wherein the masking means are coated on the glass tube has a thickness range of about 0.5 $\mu$m to about 1 $\mu$m.

16. The liquid crystal display device as claimed in claim 13, wherein the masking means comprise a transition metal oxide.

17. The liquid crystal display device as claimed in claim 16, wherein the transition metal oxide is selected from the group consisting of $TiO_2$, $Y_2O_3$ and $Ce_2O_5$.

18. The liquid crystal display device as claimed in claim 13, wherein the masking means comprise $SiO_2$.

19. The liquid crystal display device as claimed in claim 13, wherein the masking means cut off ultraviolet rays having wavelengths of 253 nm, 313 nm and 365 nm.

20. The liquid crystal display device as claimed in claim 13, further comprising a lamp cover for receiving and protecting the lamp unit, wherein said lamp cover has an opening opposite to a light incidence surface of the light guiding unit, and the masking means are formed on an inner surface thereof.

21. The liquid crystal display device as claimed in claim 13, wherein the light guiding unit comprises at least one polyolefin resin composition.

22. The liquid crystal display device as claimed in claim 21, wherein the light guiding means are formed by mixing the polyolefin resin composition with one selected from the group consisting of $TiO_2$, $Y_2O_3$, $Ce_2O_5$ and $SiO_2$.

23. The liquid crystal display device as claimed in claim 13, wherein the light guiding means are formed by mixing the polyolefin resin with a benzene derivative.

24. The liquid crystal display device as claimed in claim 23, wherein the benzene derivative is 2-(e⁻-hydroxy-5-methlyphenol)-benzotriazole or p-phenylene-bis (1,3-benzoxizine)-4-5ne.

25. A liquid crystal display device comprising:

a lamp unit for generating light in response to an electric current applied to an electrode disposed in a glass tube, the glass tube being filled up with a gas filler and including a mixture layer having a fluorescence material therein;

a light guide for guiding the light;

a display unit for displaying image in response to the light transmitted from the light guide;

a mask for cutting off a part of ultraviolet rays in the light emitted by the glass tube, the mask made of a transition metal oxide and disposed on at least one of an inner surface of the glass tube, an outer surface of the glass tube and a light incidence surface of the light guiding unit, the glass tube located between the mixture layer and the glass tube, and the light guiding unit into which the light emitted by the lamp unit being incident;

a receiving unit for receiving the lamp unit and the light guiding unit; and a top chassis for adjusting a position of the display unit and for fixing the display unit to the receiving unit by being assembled to face to the receiving unit.

26. The liquid crystal display device as claimed in claim 25, wherein the mask is coated on the glass tube by a thickness that ranges from about 0.5 $\mu$m to about 1 $\mu$m.

27. The liquid crystal display device as claimed in claim 25, wherein the transition metal oxide is one selected from the group consisting of $TiO_2$, $Y_2O_3$ and $Ce_2O_5$.

28. The liquid crystal display device as claimed in claim 25, wherein the mask comprises $SiO_2$.

29. The liquid crystal display device as claimed in claim 25, wherein the mask cuts off ultraviolet rays having wavelengths of 253 nm, 313 nm and 365 nm.

30. The liquid crystal display device as claimed in claim 25, further comprising a lamp cover for receiving and protecting the lamp unit, wherein said lamp cover has an opening opposite to the light incidence surface of the light guiding unit, and the mask is formed on an inner surface thereof.

31. The liquid crystal display device as claimed in claim 25, wherein the light guide comprises at least one polyolefin resin composition.

32. The liquid crystal display device as claimed in claim 31, wherein the light guide is formed by mixing the polyolefin resin with one selected from the group consisting of $TiO_2$, $Y_2O_3$, $Ce_2O_5$ and $SiO_2$.

33. The liquid crystal display device as claimed in claim 25, wherein the light guide is formed by mixing the polyolefin resin with a benzene derivative.

34. The liquid crystal display device as claimed in claim 33, wherein the benzene derivative is 2-($e^-$-hydroxy-5-methlyphenol)-benzotriazole or p-phenylene-bis (1,3-benzoxizine)-4-5ne.

* * * * *